US010228941B2

United States Patent
Toll et al.

(10) Patent No.: US 10,228,941 B2
(45) Date of Patent: Mar. 12, 2019

(54) PROCESSORS, METHODS, AND SYSTEMS TO ACCESS A SET OF REGISTERS AS EITHER A PLURALITY OF SMALLER REGISTERS OR A COMBINED LARGER REGISTER

(71) Applicant: Intel Corporation, Santa Clara, CA (US)

(72) Inventors: Bret L. Toll, Hillsboro, OR (US);
Ronak Singhal, Portland, OR (US);
Buford M. Guy, Austin, TX (US);
Mishali Naik, Santa Clara, CA (US)

(73) Assignee: Intel Corporation, Santa Clara, CA (US)

( * ) Notice: Subject to any disclaimer, the term of this patent is extended or adjusted under 35 U.S.C. 154(b) by 571 days.

(21) Appl. No.: 13/931,047

(22) Filed: Jun. 28, 2013

(65) Prior Publication Data
US 2015/0006865 A1    Jan. 1, 2015

(51) Int. Cl.
*G06F 9/30*    (2018.01)

(52) U.S. Cl.
CPC ........ *G06F 9/30036* (2013.01); *G06F 9/3016* (2013.01); *G06F 9/30109* (2013.01); *G06F 9/30112* (2013.01); *G06F 9/30192* (2013.01)

(58) Field of Classification Search
None
See application file for complete search history.

(56) References Cited

U.S. PATENT DOCUMENTS

| 5,513,366 | A | * | 4/1996 | Agarwal | G06F 9/30036 712/2 |
| 5,991,531 | A | * | 11/1999 | Song | G06F 9/30014 703/23 |
| 6,014,684 | A | * | 1/2000 | Hoffman | G06F 7/5324 708/620 |
| 6,014,739 | A | * | 1/2000 | Christie | G06F 9/30112 712/228 |
| 6,122,725 | A | * | 9/2000 | Roussel | G06F 9/30014 712/200 |

(Continued)

FOREIGN PATENT DOCUMENTS

| CN | 1595389 A | 3/2005 |
| CN | 101620589 A | 1/2010 |

(Continued)

OTHER PUBLICATIONS

'Microunity Technology' archived from Jul. 21, 2012 from microunity.com.*

(Continued)

*Primary Examiner* — Steven G Snyder
(74) *Attorney, Agent, or Firm* — Nicholson De Vos Webster & Elliott LLP

(57) ABSTRACT

A processor of an aspect includes a set of registers capable of storing packed data. An execution unit is coupled with the set of registers. The execution unit is to access the set of registers in at least two different ways in response to instructions. The at least two different ways include a first way in which the set of registers are to represent a plurality of N-bit registers. The at least two different ways also include a second way in which the set of registers are to represent a single register of at least 2N-bits. In one aspect, the at least 2N-bits is to be at least 256-bits.

30 Claims, 16 Drawing Sheets

(56) References Cited

U.S. PATENT DOCUMENTS

| | | | | |
|---|---|---|---|---|
| 6,154,831 | A * | 11/2000 | Thayer | G06F 9/30014 712/208 |
| 6,192,467 | B1 * | 2/2001 | Abdallah | G06F 9/30036 712/222 |
| 6,230,253 | B1 * | 5/2001 | Roussel | G06F 9/30014 712/208 |
| 6,233,671 | B1 * | 5/2001 | Abdallah | G06F 9/30014 712/210 |
| 6,260,137 | B1 * | 7/2001 | Fleck | G06F 9/30036 712/224 |
| 6,295,599 | B1 * | 9/2001 | Hansen | G06F 9/30014 712/208 |
| 6,687,810 | B2 * | 2/2004 | Roussel | G06F 9/30014 708/490 |
| 7,249,350 | B2 * | 7/2007 | Wang | G06F 8/52 712/22 |
| 7,366,881 | B2 * | 4/2008 | Roussel | G06F 9/30014 712/220 |
| 7,383,427 | B2 * | 6/2008 | Yamazaki | G06F 9/30101 712/20 |
| 7,668,897 | B2 * | 2/2010 | Kershaw | G06F 9/3001 708/513 |
| 7,882,325 | B2 * | 2/2011 | Sperber | G06F 9/30036 711/167 |
| 8,103,858 | B2 * | 1/2012 | Sperber | G06F 9/30036 712/222 |
| 8,601,246 | B2 * | 12/2013 | Peleg | G06F 9/30025 712/22 |
| 8,694,758 | B2 * | 4/2014 | Orenstien | G06F 9/30036 712/228 |
| 9,804,851 | B2 * | 10/2017 | Grisenthwaite | G06F 9/3001 |
| 10,073,695 | B2 * | 9/2018 | Anderson | G06F 9/30014 |
| 2002/0010847 | A1 * | 1/2002 | Abdallah | G06F 9/30014 712/22 |
| 2002/0184474 | A1 * | 12/2002 | Roussel | G06F 9/30014 712/221 |
| 2003/0120903 | A1 * | 6/2003 | Roussel | G06F 9/30032 712/221 |
| 2004/0093480 | A1 * | 5/2004 | Hagiwara | G06F 9/30 712/210 |
| 2004/0255100 | A1 * | 12/2004 | Kershaw | G06F 9/3001 712/224 |
| 2008/0016319 | A1 * | 1/2008 | Pappalardo | G06F 9/30036 712/22 |
| 2008/0184007 | A1 * | 7/2008 | Codrescu | G06F 9/30032 712/1 |
| 2008/0235496 | A1 * | 9/2008 | Pechanek | G06F 9/30014 712/220 |
| 2009/0172363 | A1 * | 7/2009 | Orenstien | G06F 9/30036 712/225 |
| 2009/0327665 | A1 * | 12/2009 | Sperber | G06F 9/30036 712/222 |
| 2010/0100692 | A1 * | 4/2010 | Mitran | G06F 9/30145 711/154 |
| 2010/0106942 | A1 | 4/2010 | Garg et al. | |
| 2011/0225397 | A1 * | 9/2011 | Grisenthwaite | G06F 9/30174 712/208 |
| 2011/0231633 | A1 * | 9/2011 | Grisenthwaite | G06F 9/3001 712/208 |
| 2011/0320765 | A1 | 12/2011 | Karkhanis et al. | |
| 2013/0117537 | A1 * | 5/2013 | Peleg | G06F 9/30025 712/208 |
| 2016/0188336 | A1 * | 6/2016 | Valentine | G06F 9/30021 712/5 |
| 2016/0266902 | A1 * | 9/2016 | Corbal | G06F 9/30014 |
| 2017/0300335 | A1 * | 10/2017 | Ramanujam | G06F 9/384 |

FOREIGN PATENT DOCUMENTS

| | | |
|---|---|---|
| EP | 1873627 A1 | 1/2008 |
| RU | 2193228 C2 | 11/2002 |
| WO | 2014/210345 A1 | 12/2014 |

OTHER PUBLICATIONS

'Introduction to Intel Advanced Vector Extensions' by Chris Lomont, May 23, 2011.*

'Advanced 80386 Programming Techniques' by James L. Turley, copyright 1988, pp. 18-20.*

International Search Report and Written Opinion received for PCT Patent Application No. PCT/US2014/044389, dated Sep. 30, 2014, 10 pages.

International Preliminary Report on Patentability and Written Opinion received for PCT Patent Application No. PCT/US2014/044389, dated Jan. 7, 2016, 7 Pages.

Office Action and Search Report received for Taiwanese Patent Application No. 103121215, dated Feb. 25, 2016, 25 pages (13 pages of English Translation and 12 pages of Official Copy).

Office Action received for Korean Patent Application No. 10-2015-7031786, dated Nov. 10, 2016, 15 pages of Korean Office Action including 7 pages of English Translation.

Office Action and Search Report received for Taiwan Patent Application No. 103121215, dated Oct. 26, 2016, 29 pages of Taiwan Office Action including 15 pages of English Translation.

Extended European Search Report received for European Patent Application No. 14818729.7, dated Jan. 23, 2017, 8 pages.

Office Action received for Russian Patent Application No. 2015151125, dated Jan. 30, 2017, 15 pages of Russian Office Action including 4 pages of English Translation.

Office Action received for Korean Patent Application No. 10-2015-7031786, dated Sep. 28, 2017, 7 pages of Korean Office Action including 3 pages of English Translation.

Notice of Allowance received for Korean Patent Application No. 10-2015-7031786, dated Feb. 6, 2018, 3 pages of Korean Notice of Allowance including 1 page of English Translation.

Office Action received for Chinese Patent Application No. 201480030775.1, dated Mar. 2, 2018, 24 pages of Chinese Office Action including 14 pages of English Translation.

Communication pursuant to Article 94(3) EPC for Application No. 14818729.7, dated Jul. 20, 2018, 8 pages.

First Office Action and Search Report from foreign counterpart Chinese Patent Application No. 201480030775.1, dated Mar. 2, 2018, 26 pages.

Office Action from foreign counterpart Korean Patent Application No. 10-2015-7031786, dated Sep. 28, 2017, 7 pages.

Second Office Action from foreign counterpart Chinese Patent Application No. 201480030775.1, dated Dec. 25, 2018, 8 pages.

* cited by examiner

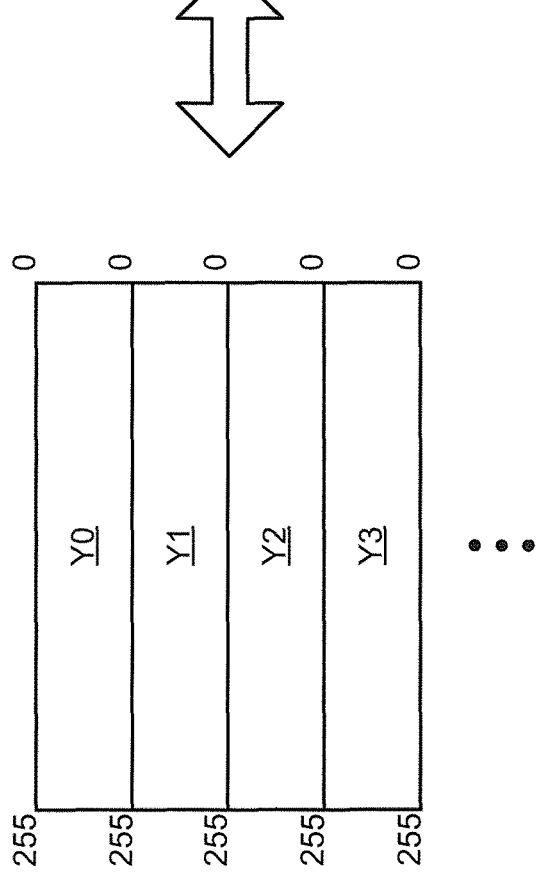
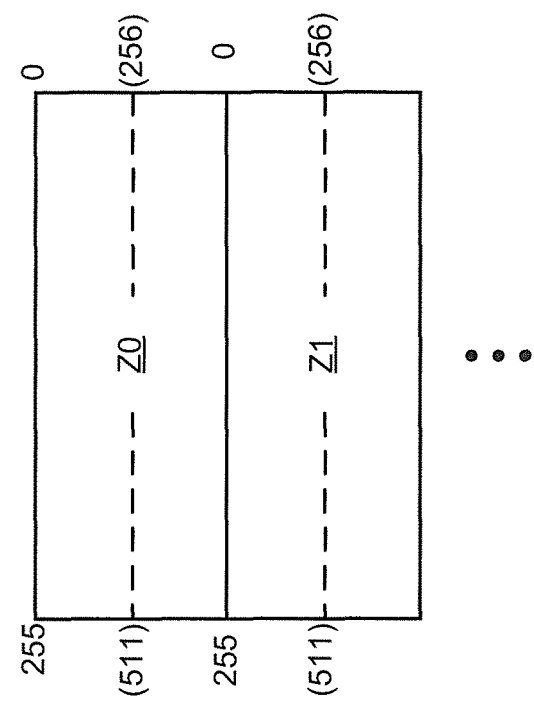
FIG. 6

FIRST INSTRUCTION FORMAT
730A

| OPCODE TO INDICATE HOW REGISTERS VIEWED 732A | VARIOUS CONVENTIONAL FIELDS (E.G., SOURCE AND/OR DEST SPECIFIER FIELDS, ETC.) 734A |
|---|---|

FIG. 7A

SECOND INSTRUCTION FORMAT
730B

| OPCODE 732B | FIELD TO INDICATE HOW REGISTERS VIEWED 738 | VARIOUS CONVENTIONAL FIELDS (E.G., SOURCE AND/OR DEST SPECIFIER FIELDS, ETC.) 734B |
|---|---|---|

FIG. 7B

THIRD INSTRUCTION FORMAT
730C

| OPCODE OR FIELD TO INDICATE HOW REGISTERS VIEWED 732C | FIELD(S) TO INDICATE WHICH REGISTERS TO COMBINE 740 | VARIOUS CONVENTIONAL FIELDS 734C |
|---|---|---|

FIG. 7C

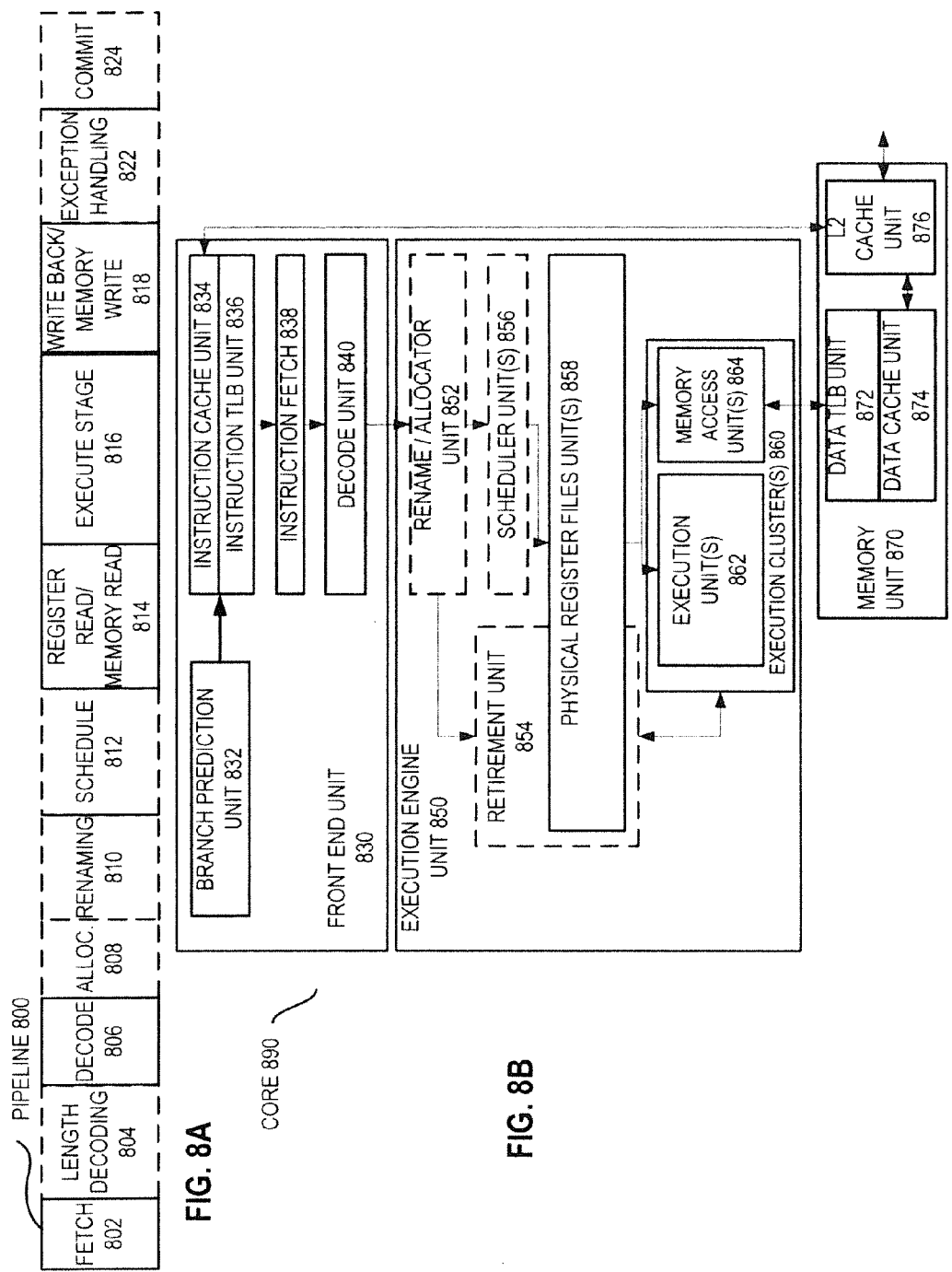

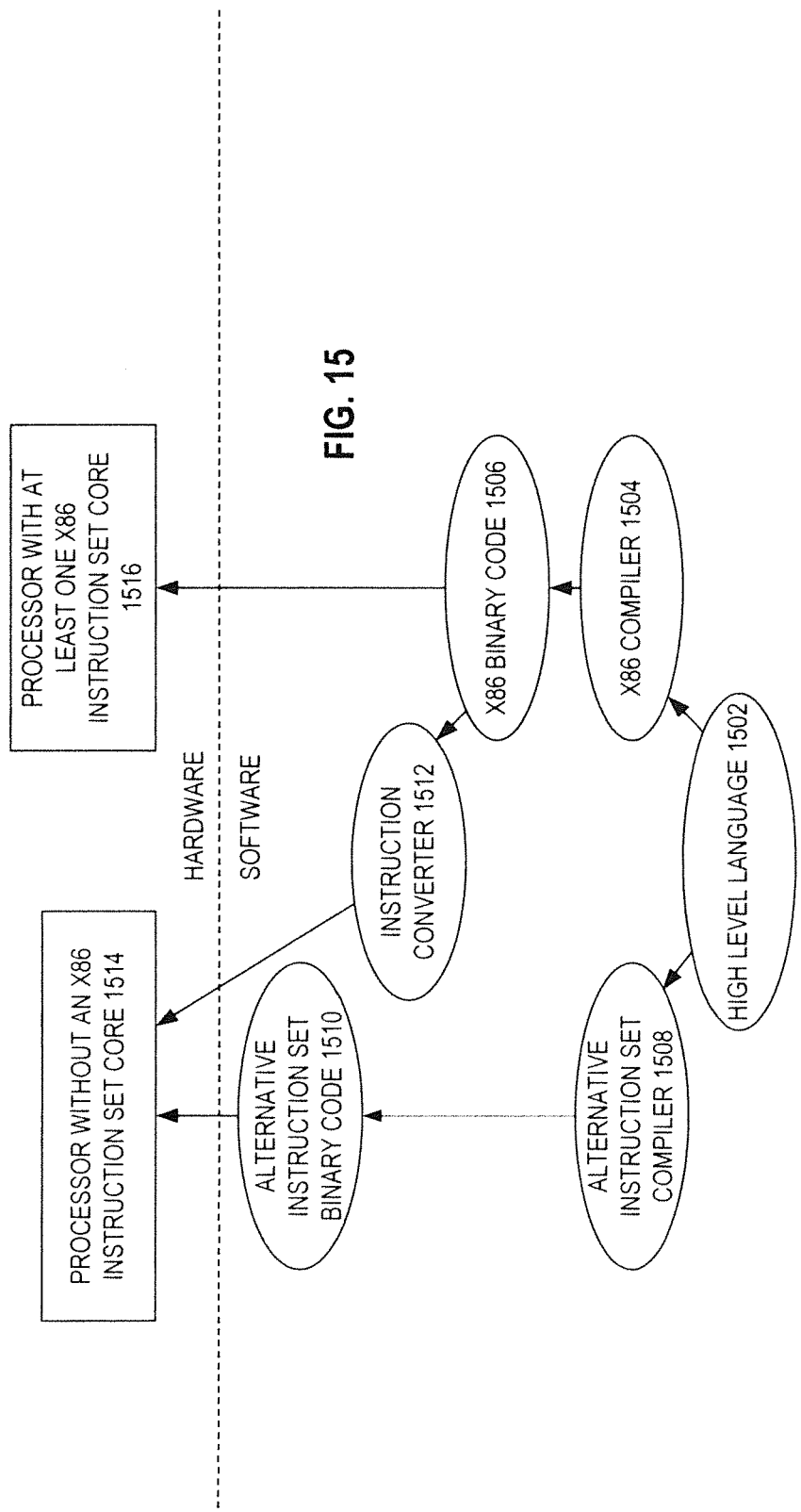

PROCESSORS, METHODS, AND SYSTEMS TO ACCESS A SET OF REGISTERS AS EITHER A PLURALITY OF SMALLER REGISTERS OR A COMBINED LARGER REGISTER

BACKGROUND

Technical Field

Embodiments described herein generally relate to processors. In particular, embodiments described herein generally relate to utilization of registers in processors.

Background Information

Many processors have Single Instruction, Multiple Data (SIMD) architectures. In SIMD architectures, a packed data instruction, vector instruction, or SIMD instruction may operate on multiple data elements (e.g., multiple pairs of data elements) concurrently (e.g., in parallel). The processor may have parallel execution hardware responsive to the packed data instruction to perform the multiple operations concurrently (e.g., in parallel).

Multiple data elements may be packed within registers or memory locations as packed data. In packed data, the bits of the registers or other storage locations may be logically divided into a sequence of data elements. For example, a 64-bit wide packed data register may have two packed 32-bit data elements, four packed 16-bit data elements, or eight packed 8-bit data elements.

In some processors, there has been a progressive increase over the years in the width of the packed data operands. The increase in the width of the packed data operands generally allows more data elements to be processed concurrently (e.g., in parallel), which generally tends to improve performance. For example, when 128-bit packed data is used eight 16-bit data elements may be processed concurrently instead of just four 16-bit data elements in the case of 64-bit packed data.

However, one possible drawback to such use of wider packed data is a possible corresponding increase in the size of the registers and register files. For example, expanding each register of a set of 64-bit registers so that they are each 128-bit registers will likely approximately double the size of the registers (e.g., the area or footprint occupied by the registers on die). The impact will likely even be larger in implementations where there are more physical registers implemented than architectural registers since the size of a greater number of registers may be approximately doubled. Another possible drawback to such an increase in the size of the registers and register files is a corresponding increase in the amount of data (e.g., state or context) that needs to be moved to and from the registers on context switches, power mode state saves, and like transitions. For example, for each register, 128-bits in the case of a 128-bit wide register, instead of just 64-bits in the case of a 64-bit wide register, may need to be moved to and from the register.

BRIEF DESCRIPTION OF THE DRAWINGS

The invention may best be understood by referring to the following description and accompanying drawings that are used to illustrate embodiments of the invention. In the drawings:

FIG. 6 is a block diagram of an embodiment in which a set of registers are viewed or accessed as 255-bit packed data registers in a first view and 512-bit packed data registers in a second view.

FIGS. 7A-C are block diagrams of embodiments of suitable instruction formats to utilize different views of a set of registers.

FIG. 8A is a block diagram illustrating both an exemplary in-order pipeline and an exemplary register renaming, out-of-order issue/execution pipeline according to embodiments of the invention.

FIG. 8B is a block diagram illustrating both an exemplary embodiment of an in-order architecture core and an exemplary register renaming, out-of-order issue/execution architecture core to be included in a processor according to embodiments of the invention.

FIG. 15 is a block diagram contrasting the use of a software instruction converter to convert binary instructions in a source instruction set to binary instructions in a target instruction set according to embodiments of the invention.

DETAILED DESCRIPTION OF EMBODIMENTS

Disclosed herein are processors, methods, and systems that allow a set of registers to be viewed or accessed as either a plurality of relatively smaller registers or as a single relatively larger register. In the following description, numerous specific details are set forth (for example specific register sizes, numbers of registers, instructions and formats, logic implementations, processor configurations, micro-architectural details, sequences of operations, logic partitioning/integration details, types and interrelationships of system components, and the like). However, it is understood that embodiments of the invention may be practiced without these specific details. In other instances, well-known circuits, structures and techniques have not been shown in detail in order not to obscure the understanding of this description.

Figure 1:
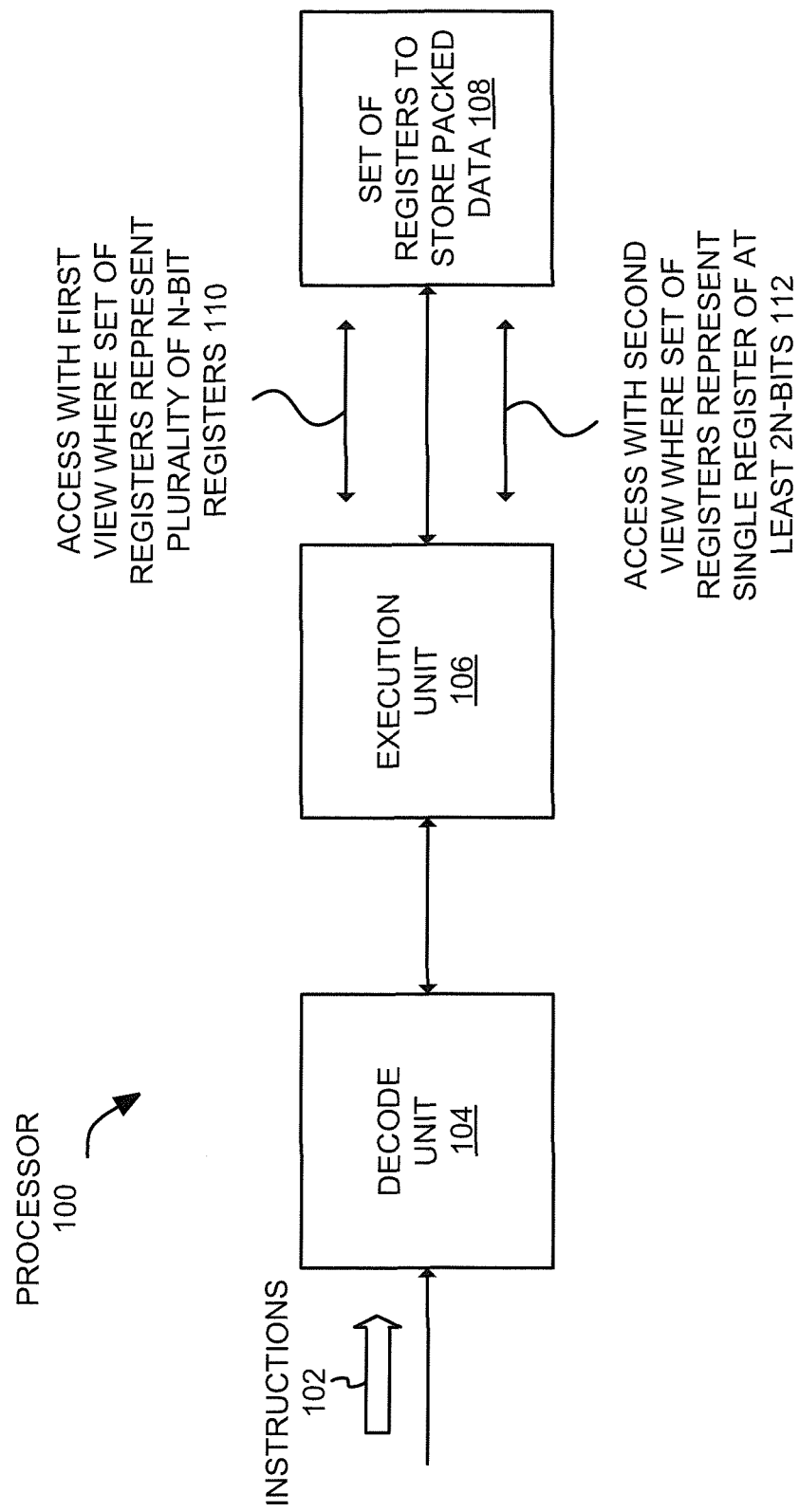
FIG. 1 is a block diagram of an embodiment of a processor.

FIG. 1 is a block diagram of an embodiment of a processor 100. The processor represents an instruction processing apparatus that is operable to process instructions. In some embodiments, the processor may be a general-purpose processor (e.g., a general-purpose microprocessor of the type often used as a central processing unit (CPU) in desktop, laptop, and like computers). Alternatively, the processor may be a special-purpose processor. Examples of suitable special-purpose processors include, but are not limited to, network processors, communications processors, cryptographic processors, graphics processors, co-processors, embedded processors, digital signal processors (DSPs), and controllers (e.g., microcontrollers), to name just a few examples. The processor may be any of various complex instruction set computing (CISC) processors, various reduced instruction set computing (RISC) processors, various very long instruction word (VLIW) processors, various hybrids thereof, or other types of processors entirely.

The processor also includes a set of registers 108. Each of the registers may represent an on-processor and/or on-die storage location. In some embodiments, the set of registers may represent packed data registers, or may otherwise be capable of storing packed data, vector data, or SIMD data. The packed data registers may be implemented in different ways in different microarchitectures using well-known techniques, and are not limited to any particular type of circuit or mechanism. Various different types of registers are suitable. Examples of suitable types of registers include, but are not limited to, dedicated physical registers, dynamically allocated physical registers using register renaming, and combinations thereof.

The processor may receive an instruction 102 that indicates at least one register implemented on or otherwise associated with the set of registers 108. The instruction may represent a machine code instruction, assembly language instruction, macroinstruction, or control signal of an instruction set of the processor. The instruction may explicitly specify (e.g., through a set of bits or one or more fields), or otherwise indicate (e.g., implicitly indicate), the at least register (e.g., as at least one source and/or destination operand). As one example, the instruction may specify a single register used as a source operand, and the single register may either also be used as a destination operand, or the instruction may additionally specify a different destination operand. As another example, the instruction may specify a first register used as a first source operand, and a second register used as a second source operand, and one of the registers specified for the source operands may either also be used as a destination operand, or the instruction may additionally specify a different destination operand. These are just a few illustrative examples. The scope of the invention is not limited by the particular type of the instruction, as long as the instruction indicates at least one register associated with the set of registers. Examples of suitable types of instructions include, but are not limited to, packed arithmetic instructions (e.g., packed add instructions, packed multiply instructions, etc.), packed logical instructions (e.g., packed rotate instructions, packed shift instructions, packed compare instructions, packed logical OR instructions, etc.), packed memory access instructions (e.g., gather instructions, scatter instructions, etc.), to name just a few examples.

The processor includes an instruction decode unit 104. The instruction decode unit may also be referred to as a decode unit, decoder, or decode logic. The decode unit may receive and decode relatively higher-level instructions (e.g., machine code instructions, assembly language instructions, macroinstructions), and output one or more relatively lower-level instructions or control signals (e.g., microinstructions, micro-operations, micro-code entry points) that reflect, represent, and/or are derived from the higher-level instructions. The one or more lower-level instructions or control signals may implement the higher-level instruction through one or more lower-level (e.g., circuit-level or hardware-level) operations. The decode unit may be implemented using various different mechanisms including, but not limited to, microcode read only memories (ROMs), look-up tables, hardware implementations, programmable logic arrays (PLAs), and other mechanisms used to implement decode units known in the art. In other embodiments, an instruction emulator, translator, morpher, interpreter, or other instruction conversion logic may be used instead of or in addition to the decode unit.

Referring again to FIG. 1, an execution unit 106 is coupled with the decode unit 104 and with the set of registers 108. By way of example, the execution unit may include an arithmetic unit, a logic unit, an arithmetic logic unit (ALU), a digital circuit or logic to perform arithmetic and logical operations, a memory execution unit, or the like. The execution unit may receive one or more decoded or otherwise converted instructions or control signals that represent and/or are derived from the instruction 102. The execution unit and/or the processor may include specific or particular logic (e.g., transistors, circuitry, or other hardware potentially combined with firmware (e.g., instructions stored in non-volatile memory) and/or software) that is operable to perform operations in response to the instruction 102 (e.g., in response to one or more instructions or control signals decoded or otherwise derived from the instruction 102).

In some embodiments, the execution unit may be operable in response to and/or as a result of the instruction 102 to access the set of registers 108 in either one or both of at least two different ways or views of the registers. In some embodiments, the at least two different ways or views may include a first way or view 110 in which the set of registers 108 are to be viewed as or otherwise represent a plurality of N-bit registers. In some embodiments, the at least two different ways or views may include a second way or view 112 in which the set of registers are to be viewed as or otherwise represent a single register of at least 2N-bits. In some embodiments, the at least 2N-bits may be at least 256-bits. In other embodiments, the set of registers may be N-bit registers (e.g., 128-bit registers, 256-bit registers, etc.). In some embodiments, the set of registers may be N/2-bit registers (e.g., 64-bit registers, 128-bit registers, etc.).

As one specific example, the set of registers 108 may consist of two N-bit registers (e.g., 128-bit registers). In the first way or view 110, the two N-bit registers (e.g., 128-bit registers) may be viewed as or otherwise represent two N-bit (e.g., 128-bit) registers. In the second way or view 112, the two N-bit registers (e.g., 128-bit registers) may be viewed as or otherwise represent a single register of at least 2N-bits (e.g., 256-bits, 512-bits, etc.). In some embodiments, there may be more than just two different views or ways of accessing a set of registers 108. For example, in some embodiments, there may be three, four, or more than four different ways of accessing or viewing the set of registers 108. For example, in some embodiments, this example may additionally support accessing the set of registers as four N/2-bit registers (e.g., 64-bit registers).

As another specific example, the set of registers 108 may consist of four N/2-bit registers (e.g., 64-bit registers). In the first way or view 110, the four N/2-bit registers (e.g., 64-bit registers) may be viewed as or otherwise represent two N-bit (e.g., 128-bit) registers. In the second way or view 112, the four N/2-bit registers (e.g., 64-bit registers) may be viewed as or otherwise represent a single register of at least 2N-bits (e.g., 256-bits, 512-bits, 1024-bits, etc.). In some embodiments, there may be at least a third way of accessing the set of registers 108. For example, in some embodiments, in the second view 112 the execution unit may view or access the four N/2-bit registers (e.g., 64-bit registers) as a single register of at least 4N-bits (e.g., 512-bits, 1024-bits, etc.), and the processor may additionally support accessing or viewing the set of registers 108 as a plurality of 2N-bit registers (e.g., 256-bits).

In some embodiments, in each of the views of the set of registers 108 and/or the ways of accessing the set of registers 108, the viewed or accessed packed data registers may be visible to software and/or a programmer and/or may be specified by instructions of the instruction set (e.g., macro-instructions, machine language instructions, assembly language instructions, etc.) to identify operands. Sometimes the registers specified by instructions of the instruction set are referred to in the arts as architecturally visible registers or architectural registers, which are contrasted to other non-architectural or non-architecturally visible registers in a given microarchitecture (e.g., temporary registers used to implement an instruction, etc.).

As shown in these detailed examples, in some embodiments, the processor may be operable to recognize, view, and/or access the set of registers 108 as either multiple relatively smaller registers (e.g., N-bit registers), or as a single relatively larger register (e.g., a register having at least 2N-bits). For example, in some embodiments, an adjacent pair of registers may be viewed separately as 128-bit registers or may be logically "combined" together and viewed collectively as a single 256-bit register. The same physical registers and same physical total number of bits may be involved in both the two 128-bit registers and the single 256-bit register, but they may be viewed in different ways. Advantageously, in some embodiments, such an approach may be used to avoid needing to expand the bit-width of the registers, while still allowing an increase in packed data register width and/or packed data operand width. Avoiding expanding the bit-width of the registers may help to avoid or at least reduce some of the possible drawbacks mentioned in the background section, for example, increased area or footprint of the registers on die and/or increased amount of data that needs to be moved into and out of the registers on context switches. In some embodiments, such an approach may be used to implement packed data registers or operands of at least 256-bits (e.g., 256-bits, 512-bits, 1024-bits, etc.), at which point the aforementioned possible drawbacks tend to become even more significant.

To avoid obscuring the description, a relatively simple processor 100 has been shown and described. In other embodiments, the processor may optionally include other well-known components found in processors. Examples of such components include, but are not limited to, a branch prediction unit, an instruction fetch unit, instruction and data translation lookaside buffers, prefetch buffers, microinstruction queues, microinstruction sequencers, a register renaming unit, an instruction scheduling unit, a retirement unit, other components included in processors, and various combinations thereof. There are literally numerous different combinations and configurations of components in processors, and embodiments are not limited to any particular combination or configuration. Embodiments may be included in processors have multiple cores, logical processors, or execution engines at least one of which includes or utilizes an embodiment disclosed herein.

Figure 2:
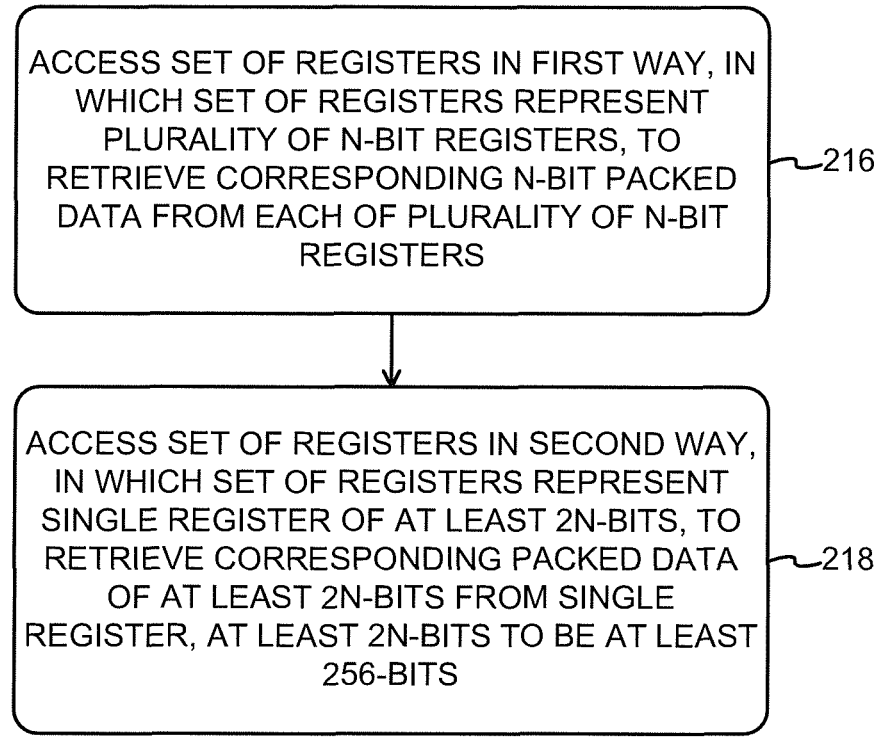
FIG. 2 is a block flow diagram of an embodiment of a method performed in and/or by a processor.

FIG. 2 is a block flow diagram of an embodiment of a method 214 performed in and/or by a processor. In some embodiments, the operations and/or method of FIG. 2 may be performed by and/or within the processor of FIG. 1. The details and optional features described above for the processor of FIG. 1 also optionally apply to the operations and/or method of FIG. 2, which may be performed by and/or within such a processor. Alternatively, the operations and/or method of FIG. 2 may be performed by and/or within a similar or different processor. Moreover, the processor of FIG. 1 may perform operations and/or methods the same as, similar to, or different than those of FIG. 2.

The method includes accessing a set of registers in a first way, at block 216. In some embodiments, in the first way, the set of registers may represent a plurality of N-bit registers. The access may be to retrieve a corresponding N-bit packed data from each of the plurality of the N-bit registers (or store a corresponding N-bit packed data to each of the plurality of the N-bit registers).

The method includes accessing the set of registers in a second different way, at block 218. In some embodiments, in the second way, the set of registers may represent a single register of at least 2N-bits. The access may be to retrieve a corresponding packed data of at least 2N-bits from the single register (or to store a corresponding packed data of at least 2N-bits to the single register). In some embodiments, the at least 2N-bits may be at least 256-bits.

In other embodiments, the method may optionally include accessing the set of registers in at least a third different way and in some cases also a fourth different way. In some embodiments, one of the ways may treat the registers as a single register having a width of at least 512-bits.

Figure 3:
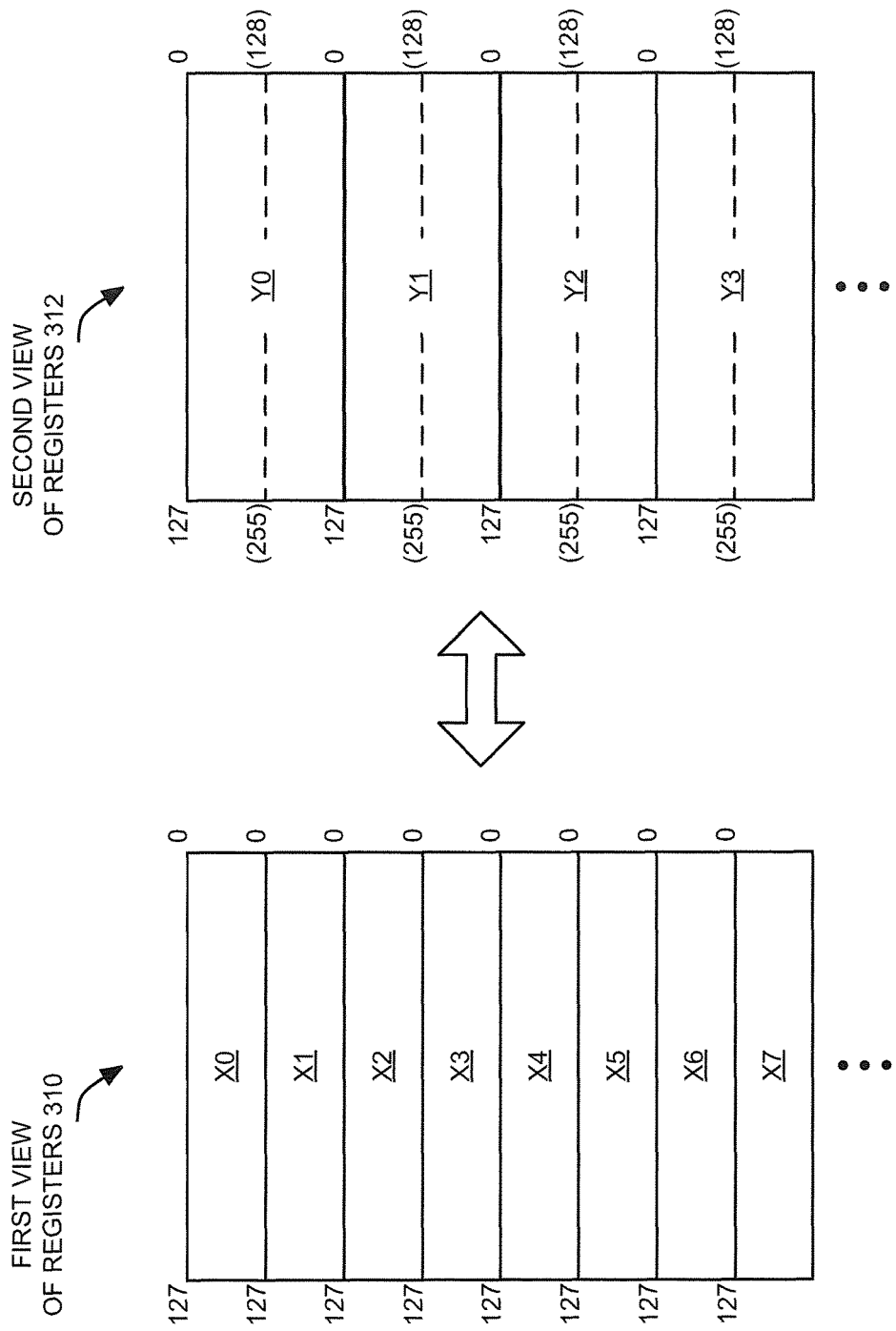
FIG. 3 is a block diagram of an embodiment in which a set of registers are viewed or accessed as 128-bit packed data registers in a first view and 256-bit packed data registers in a second view.

FIG. 3 is a block diagram illustrating an embodiment in which a set of registers are viewed or accessed as 128-bit packed data registers in a first view 310 and 256-bit packed data registers in a second view 312. In the first view 310 the set of registers (e.g., physical registers) are logically viewed or accessed as eight 128-bit packed data registers labeled X0-X7. In the second view 312 the same set of registers (e.g., physical registers) are logically viewed or accessed as four (i.e., half as many) 256-bit packed data registers labeled Y0-Y3. In the second view 312, the lowest order 128-bits (i.e., bits 127:0) of the 256-bit register Y0 maps or corresponds to the 128-bit register X0, whereas the highest order 128-bits (i.e., bits 255:128) of the 256-bit register Y0 maps or corresponds to the 128-bit register X1. Similarly, each of the other 256-bit registers Y1-Y3 includes a different pair of the 128-bit registers X2-X7. Multiple (in this case two) smaller (in this case 128-bit) registers are logically combined or grouped to form a single larger (in this case 256-bit) register. In some embodiments, the actual physical registers used to implement the views may be 64-bit registers or 128-bit registers. Alternatively, other widths may optionally be used.

Many variations on the illustrated embodiment are contemplated. In the illustrated embodiment, adjacent 128-bit registers are logically combined or grouped (e.g., X0 is combined with X1, X2 is combined with X3, etc.). In other embodiments, non-adjacent registers may be combined (e.g., non-adjacent registers in different banks, alternating registers may be combined, etc.). In the illustrated embodiment, eight 128-bit registers (X0-X7) and four 256-bit registers (Y0-Y3) are shown, although either fewer or more registers may optionally be used as desired. In one example embodiment, there may be enough registers to view at least sixteen 128-bit registers (or at least thirty-two 128-bit registers) in the first view 310 and/or enough registers to view at least eight 256-bit registers (or at least sixteen 128-bit registers) in the second view 312. Moreover, in other embodiments, three or more views may be supported in which the set of registers are viewed as 64-bit registers, 512-bit registers, 1024-bit registers, other sizes, or a combination thereof.

Figure 4:
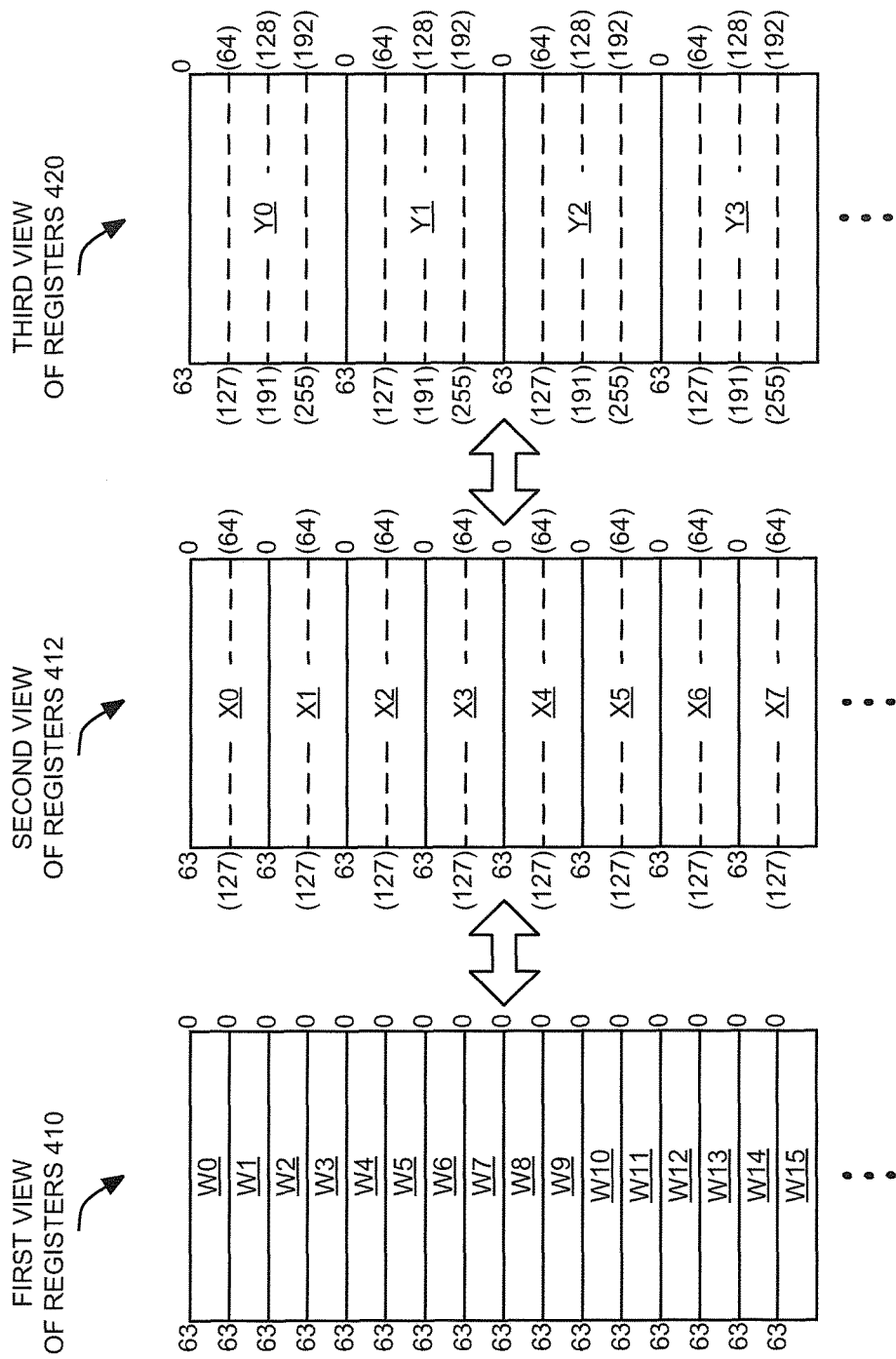
FIG. 4 is a block diagram of an embodiment in which a set of registers are viewed or accessed as 64-bit packed data registers in a first view, 128-bit packed data registers in a second view, and 256-bit packed data registers in a third view.

FIG. 4 is a block diagram illustrating an embodiment in which a set of registers are viewed or accessed as 64-bit packed data registers in a first view 410, 128-bit packed data registers in a second view 412, and 256-bit packed data registers in a third view 420. In the first view 410 the set of registers (e.g., physical registers) are logically viewed or accessed as sixteen 64-bit packed data registers labeled W0-W15.

In the second view 412 the same set of registers (e.g., physical registers) are logically viewed or accessed as eight (i.e., half as many) 128-bit packed data registers labeled X0-X7. In the second view 412, the lowest order 64-bits (i.e., bits 63:0) of the 128-bit register X0 correspond to the 64-bit register W0, whereas the highest order 64-bits (i.e., bits 127:64) of the 128-bit register X0 correspond to the 64-bit register W1. Moreover, in the second view 412, the lowest order 64-bits (i.e., bits 63:0) of the 128-bit register X1 correspond to the 64-bit register W2, whereas the highest order 64-bits (i.e., bits 127:64) of the 128-bit register X1 correspond to the 64-bit register W3.

In the third view 420 the same set of registers (e.g., physical registers) are logically viewed or accessed as four 256-bit packed data registers labeled Y0-Y3. In the third view 420, the lowest order 64-bits (i.e., bits 63:0) of the 256-bit register Y0 correspond to the 64-bit register W0, the lowest intermediate order 64-bits (i.e., bits 127:64) of the 256-bit register Y0 correspond to the 64-bit register W1, the highest intermediate order 64-bits (i.e., bits 191:128) of the 256-bit register Y0 correspond to the 64-bit register W2, and the highest order 64-bits (i.e., bits 255:192) of the 256-bit register Y0 correspond to the 64-bit register W3. Looking at it another way, in the third view 420, the lowest order 128-bits (i.e., bits 127:0) of the 256-bit register Y0 correspond to the 128-bit register X0, and the highest order 128-bits (i.e., bits 255:128) of the 256-bit register Y0 correspond to the 128-bit register X0.

In some embodiments, the actual physical registers used to implement the views may be 64-bit registers or 128-bit registers. Alternatively, other widths may optionally be used. As before, many variations on the illustrated embodiment are contemplated. For example, non-adjacent registers may be combined (e.g., non-adjacent registers in different banks, alternating registers may be combined, etc.). As another example, other numbers of registers may be used. Moreover, in other embodiments, other views may be supported in which the set of registers are viewed as 512-bit registers, 1024-bit registers, other sizes, or a combination thereof.

Figure 5:
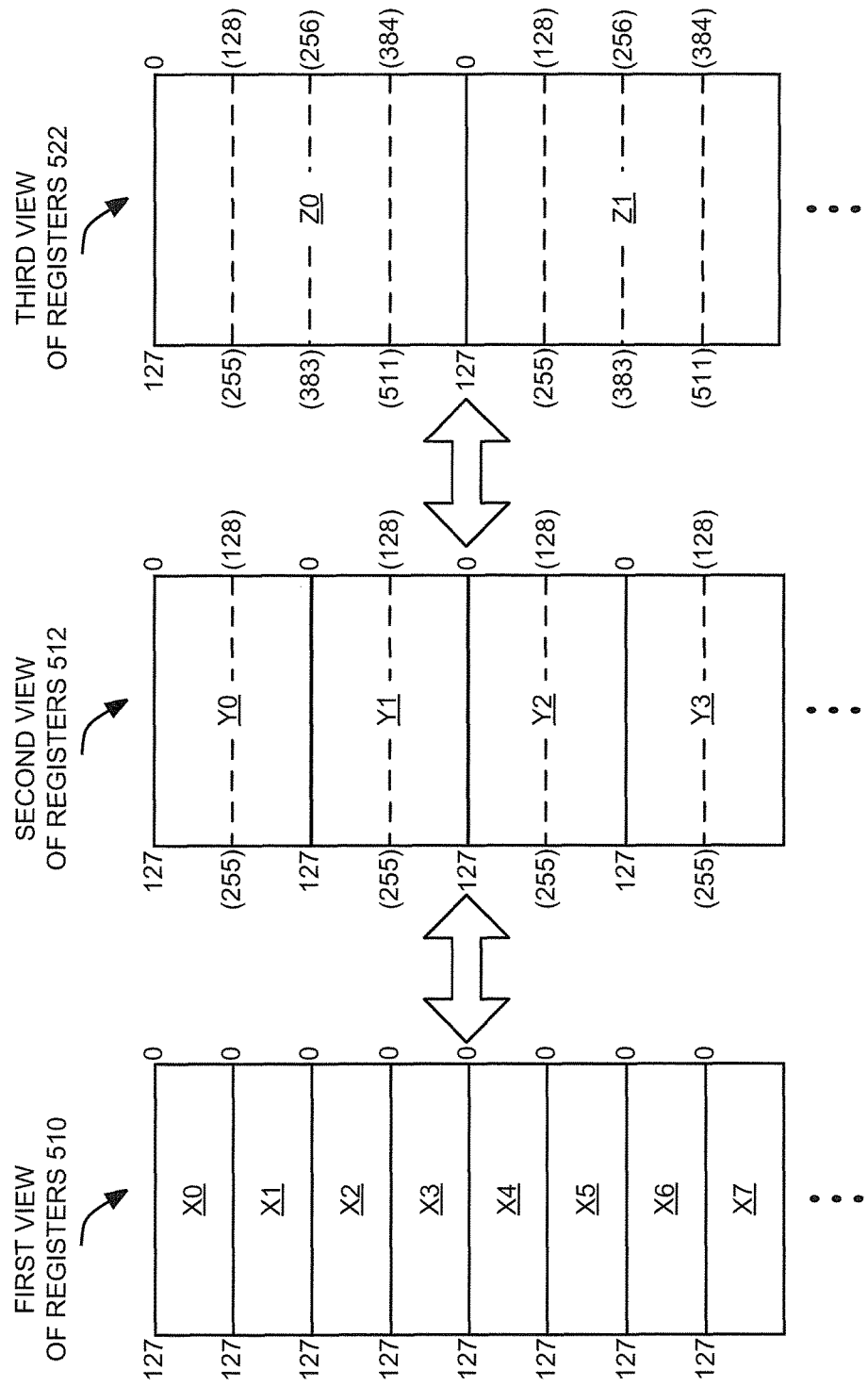
FIG. 5 is a block diagram of an embodiment in which a set of registers are viewed or accessed as 128-bit packed data registers in a first view, 256-bit packed data registers in a second view, and 512-bit packed data registers in a third view.

FIG. 5 is a block diagram illustrating an embodiment in which a set of registers are viewed or accessed as 128-bit packed data registers in a first view 510, 256-bit packed data registers in a second view 512, and 512-bit packed data registers in a third view 522. In the first view 510 the set of registers (e.g., physical registers) are logically viewed or accessed as eight 128-bit packed data registers labeled X0-X7. In the second view 512 the same set of registers (e.g., physical registers) are logically viewed or accessed as four (i.e., half as many) 256-bit packed data registers labeled Y0-Y3. This configuration may be similar to the approach shown and described for FIG. 3.

In the third view 522, the same set of registers (e.g., physical registers) are logically viewed or accessed as two 512-bit packed data registers labeled Z0-Z1. In the third view 522, the lowest order 128-bits (i.e., bits 127:0) of the 512-bit register Z0 correspond to the 128-bit register X0, the lowest intermediate order 128-bits (i.e., bits 255:128) of the 512-bit register Z0 correspond to the 128-bit register X1, the highest intermediate order 128-bits (i.e., bits 383:256) of the 512-bit register Z0 correspond to the 128-bit register X2, and the highest order 128-bits (i.e., bits 511:384) of the 512-bit register Z0 correspond to the 128-bit register X3. Looking at it another way, in the third view 522, the lowest order 256-bits (i.e., bits 255:0) of the 512-bit register Z0 correspond to the 256-bit register Y0, the highest order 256-bits (i.e., bits 511:256) of the 512-bit register Z0 correspond to the 256-bit register Y1. Similarly, each of the other registers have similar correspondence as shown by the bit labels.

In some embodiments, the actual physical registers used to implement the views may be 64-bit registers or 128-bit registers. Alternatively, other widths may optionally be used. As before, many variations on the illustrated embodiment are contemplated. For example, non-adjacent registers may be combined (e.g., non-adjacent registers in different banks, alternating registers may be combined, etc.). As another example, other numbers of registers may be used. Moreover, in other embodiments, other views may be supported in which the set of registers are viewed as 64-bit registers, 1024-bit registers, other sizes, or a combination thereof.

FIG. 6 is a block diagram illustrating an embodiment in which a set of registers are viewed or accessed as 255-bit packed data registers in a first view 610 and 512-bit packed data registers in a second view 612. In the first view 610 the set of registers (e.g., physical registers) are logically viewed or accessed as four 255-bit packed data registers labeled Y0-Y3. In the second view 612 the same set of registers (e.g., physical registers) are logically viewed or accessed as two (i.e., half as many) 512-bit packed data registers labeled Z0-Z3. In the second view 612, the lowest order 255-bits (i.e., bits 255:0) of the 512-bit register Z0 correspond to the 255-bit register Y0, and the highest order 255-bits (i.e., bits 511:256) of the 512-bit register Z0 correspond to the 256-bit register Y1. Similarly, each of the other registers have similar correspondence as shown by the bit labels.

In some embodiments, the actual physical registers used to implement the views may be 64-bit registers, 128-bit registers, or 255-bit registers. Alternatively, other widths may optionally be used. As before, many variations on the illustrated embodiment are contemplated. For example, non-adjacent registers may be combined (e.g., non-adjacent registers in different banks, alternating registers may be combined, etc.). As another example, other numbers of registers may be used. Moreover, in other embodiments, other views may be supported in which the set of registers are viewed as 64-bit registers, 128-bit registers, 1024-bit registers, other sizes, or a combination thereof.

FIGS. 7A-C are block diagrams of embodiments of suitable instruction formats to utilize different views of a set of registers. FIG. 7A is a block diagram of a first embodiment of a suitable instruction format 730A. In this embodiment, the instruction format has an operation code or opcode 732A that is operable to indicate how a set of registers are to be viewed or accessed when processing the instruction. Conventionally, the opcode may represent a plurality of bits or one or more fields that are operable to identify the instruction and/or the operation to be performed. In some embodiments, the opcode may also explicitly specify or implicitly indicate how the set of registers are to be viewed or accessed when processing the instruction. For example, certain opcodes and/or operations may implicitly utilize the set of registers in a given way. For example, an opcode for a packed multiply operation performed on 128-bit source registers may implicitly indicate that the destination is to be viewed as a 256-bit register to store full products that are twice the size of the source data elements.

The instruction format also includes any of various conventional fields 734A depending upon the particular type of instruction. Examples of such conventional fields include, but are not limited to, one or more fields to specify one or more source operands and/or one or more fields to specify one or more destination operands. These operands may represent registers as described herein, memory locations, or other storage locations. Source and/or destination operands may also be implicitly indicated by the instruction instead of explicitly specified. Moreover, a register or other storage location for a source operand may be reused for a destination operand. Other examples of conventional fields include, but are not limited to, one or more immediates, a field to indicate a packed data operation mask (e.g., a mask used for predication), a field of predication or masking control, a field of broadcast control, a field of floating point rounding control, and other conventional fields known in the arts.

FIG. 7B is a block diagram of a second embodiment of a suitable instruction format 730B. In this embodiment, the instruction format has an operation code or opcode 732B. In some embodiments, the instruction format also has a dedicated field 738 to indicate how a set of registers are to be viewed or accessed when processing the instruction. In this embodiment, the field 738 may be separate from or different from the opcode. In some embodiments, the field may include a single bit to select between either of two different views of the set of registers. Alternatively, the field may have two or more bits to select between more than two different views of the registers. Allowing the instruction to indicate the view (e.g., either through the opcode or a separate dedicated field) may allow the instruction to indicate the view and may help to avoid needing to perform a mode change. Alternatively, software (e.g., an operating system, hypervisor, etc.) may change a mode of operation for a logical processor to indicate the view. The instruction format also includes any of various conventional fields 734B depending upon the particular type of instruction. The previously described conventional fields are suitable.

FIG. 7C is a block diagram of a third embodiment of a suitable instruction format 730C. As shown, in some embodiments, the instruction format may have an opcode 732C that is operable to indicate how a set of registers are to be viewed or accessed when processing the instruction. Alternatively, the instruction format may have a dedicated field similar to the one in the second instruction format of FIG. 7B. The instruction format also includes one or more fields to indicate which registers of the set are to be combined to make relatively larger registers. This may be done in various different ways in different embodiments. In one embodiment, fields may be included to explicitly specify two 128-bit registers, or four 64-bit registers, which are to be combined to make a single 256-bit register. In other embodiments, one or more fields may be used to select between different predetermined ways of combining the registers. For example, one way would be to use adjacent registers, another way would be to use every other register, and yet another way would be to use sequential registers in different register banks. The instruction format also includes any of various conventional fields 734C depending upon the particular type of instruction. The previously described conventional fields are suitable.

These are just a few examples of suitable instruction formats. It is to be appreciated that additional fields may optionally be added to any of these instruction formats. Moreover, as mentioned, content may be implicitly indicated instead of explicitly specified. Although the discussion above refers to fields, it is to be appreciated that the fields need not include sequences of bits but may instead optionally be formed of non-contiguous bits. Fields may also optionally overlap. Additionally, the illustrated order/arrangement of the fields is only illustrative and in other embodiments the fields may be moved or rearranged.

Figure 7D:
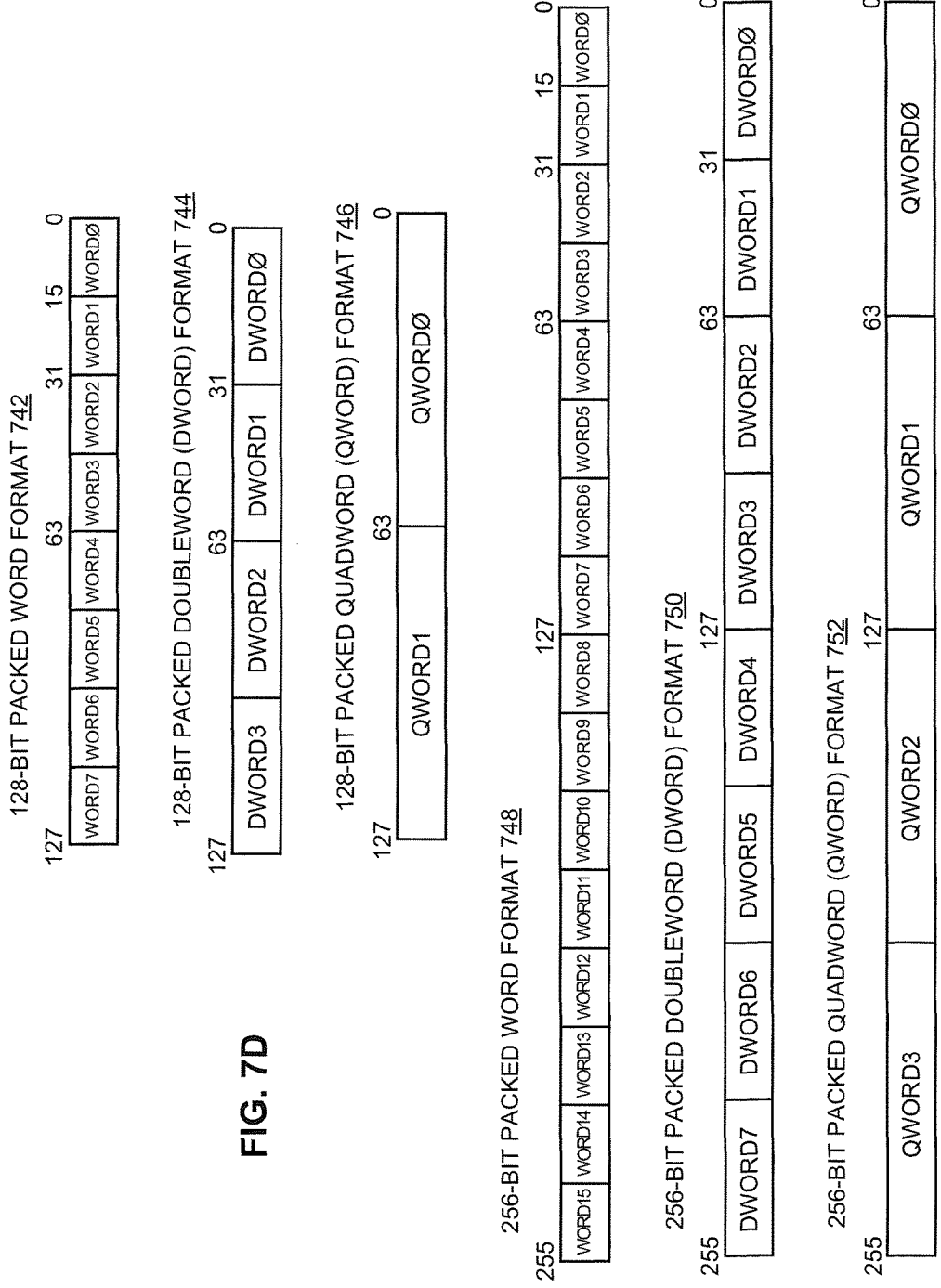
FIG. 7D is a block diagram of examples of suitable packed data formats.

FIG. 7D is a block diagram illustrating examples of suitable packed data formats. In the illustrations, the numbers above the boxes represent bit positions. A 128-bit packed word format 842 is 128-bits wide and includes eight 16-bit wide word data elements labeled in the illustration from least to most significant bit positions as WORD0 through WORD7. A 128-bit packed doubleword format 844 is 128-bits and includes four 32-bit doubleword data elements labeled from least to most significant bit positions as DWORD0 through DWORD3. A 128-bit packed quadword format 846 is 128-bits and includes two 64-bit quadword data elements labeled from the least to most significant bit positions as QWORD0 through QWORD1.

A 256-bit packed word format 848 is 256-bits wide and includes sixteen 16-bit wide word data elements labeled in the illustration from least to most significant bit positions as WORD0 through WORD15. A 256-bit packed doubleword format 850 is 256-bits and includes eight 32-bit doubleword data elements labeled from least to most significant bit positions as DWORD0 through DWORD7. A 256-bit packed quadword format 852 is 256-bits and includes four 64-bit quadword data elements labeled from the least to most significant bit positions as QWORD0 through QWORD3.

Other packed data formats are also suitable. For example, other suitable 128-bit and 256-bit packed data formats include packed 8-bit byte formats, packed 32-bit single precision floating point formats, and packed 64-bit double precision floating point formats. The packed byte formats may have twice as many data elements as the packed word format and each data element may be half as wide. The single and double precision floating point formats may respectively appear similar to the illustrated doubleword and quadword formats, although the meaning/interpretation of the bits within the data elements may be different. Moreover, wider or narrower packed data widths are also suitable, such as, for example, 64-bit packed data, 512-bit packed data, 1024-bit packed data, etc. Any of the byte, word, doubleword, quadword, or other formats are suitable. Generally, the number of packed data elements is equal to the size in bits of the packed data divided by the size in bits of the packed data elements.

The optional details of the views or register attributes described for any of FIGS. 3-6 may optionally apply to the processor of FIG. 1 and/or the method of FIG. 2. The optional details of the instruction formats of FIG. 7A-D may optionally apply to the processor of FIG. 1 and/or the method of FIG. 2. Moreover, components, features, and details described herein for any of the apparatus may also optionally be used in any of the methods described herein, which in embodiments may be performed by and/or with such the apparatus.

Exemplary Core Architectures, Processors, and Computer Architectures

Processor cores may be implemented in different ways, for different purposes, and in different processors. For instance, implementations of such cores may include: 1) a general purpose in-order core intended for general-purpose computing; 2) a high performance general purpose out-of-order core intended for general-purpose computing; 3) a special purpose core intended primarily for graphics and/or scientific (throughput) computing. Implementations of different processors may include: 1) a CPU including one or more general purpose in-order cores intended for general-purpose computing and/or one or more general purpose out-of-order cores intended for general-purpose computing; and 2) a coprocessor including one or more special purpose cores intended primarily for graphics and/or scientific (throughput). Such different processors lead to different computer system architectures, which may include: 1) the coprocessor on a separate chip from the CPU; 2) the coprocessor on a separate die in the same package as a CPU; 3) the coprocessor on the same die as a CPU (in which case, such a coprocessor is sometimes referred to as special purpose logic, such as integrated graphics and/or scientific (throughput) logic, or as special purpose cores); and 4) a system on a chip that may include on the same die the described CPU (sometimes referred to as the application core(s) or application processor(s)), the above described coprocessor, and additional functionality. Exemplary core architectures are described next, followed by descriptions of exemplary processors and computer architectures.

Exemplary Core Architectures

In-Order and Out-of-Order Core Block Diagram

FIG. 8A is a block diagram illustrating both an exemplary in-order pipeline and an exemplary register renaming, out-of-order issue/execution pipeline according to embodiments of the invention. FIG. 8B is a block diagram illustrating both an exemplary embodiment of an in-order architecture core and an exemplary register renaming, out-of-order issue/execution architecture core to be included in a processor according to embodiments of the invention. The solid lined boxes in FIGS. 8A-B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 8A, a processor pipeline 800 includes a fetch stage 802, a length decode stage 804, a decode stage 806, an allocation stage 808, a renaming stage 810, a scheduling (also known as a dispatch or issue) stage 812, a register read/memory read stage 814, an execute stage 816, a write back/memory write stage 818, an exception handling stage 822, and a commit stage 824.

FIG. 8B shows processor core 890 including a front end unit 830 coupled to an execution engine unit 850, and both are coupled to a memory unit 870. The core 890 may be a reduced instruction set computing (RISC) core, a complex instruction set computing (CISC) core, a very long instruction word (VLIW) core, or a hybrid or alternative core type. As yet another option, the core 890 may be a special-purpose core, such as, for example, a network or communication core, compression engine, coprocessor core, general purpose computing graphics processing unit (GPGPU) core, graphics core, or the like.

The front end unit 830 includes a branch prediction unit 832 coupled to an instruction cache unit 834, which is coupled to an instruction translation lookaside buffer (TLB) 836, which is coupled to an instruction fetch unit 838, which is coupled to a decode unit 840. The decode unit 840 (or decoder) may decode instructions, and generate as an output one or more micro-operations, micro-code entry points, microinstructions, other instructions, or other control signals, which are decoded from, or which otherwise reflect, or are derived from, the original instructions. The decode unit 840 may be implemented using various different mechanisms. Examples of suitable mechanisms include, but are not limited to, look-up tables, hardware implementations, programmable logic arrays (PLAs), microcode read only memories (ROMs), etc. In one embodiment, the core 890 includes a microcode ROM or other medium that stores microcode for certain macroinstructions (e.g., in decode unit 840 or otherwise within the front end unit 830). The decode unit 840 is coupled to a rename/allocator unit 852 in the execution engine unit 850.

The execution engine unit 850 includes the rename/allocator unit 852 coupled to a retirement unit 854 and a set of one or more scheduler unit(s) 856. The scheduler unit(s) 856 represents any number of different schedulers, including reservations stations, central instruction window, etc. The scheduler unit(s) 856 is coupled to the physical register file(s) unit(s) 858. Each of the physical register file(s) units 858 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one embodiment, the physical register file(s) unit 858 comprises a vector registers unit, a write mask registers unit, and a scalar registers unit. These register units may provide architectural vector registers, vector mask registers, and general purpose registers. The physical register file(s) unit(s) 858 is overlapped by the retirement unit 854 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement unit 854 and the physical register file(s) unit(s) 858 are coupled to the execution cluster(s) 860. The execution cluster(s) 860 includes a set of one or more execution units 862 and a set of one or more memory access units 864. The execution units 862 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. The scheduler unit(s) 856, physical register file(s) unit(s) 858, and execution cluster(s) 860 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster— and in the case of a separate memory access pipeline, certain embodiments are implemented in which only the execution cluster of this pipeline has the memory access unit(s) 864. It should also be understood that where separate pipelines are used, one or more of these pipelines may be out-of-order issue/execution and the rest in-order.

The set of memory access units 864 is coupled to the memory unit 870, which includes a data TLB unit 872 coupled to a data cache unit 874 coupled to a level 2 (L2) cache unit 876. In one exemplary embodiment, the memory access units 864 may include a load unit, a store address unit, and a store data unit, each of which is coupled to the data TLB unit 872 in the memory unit 870. The instruction cache unit 834 is further coupled to a level 2 (L2) cache unit 876 in the memory unit 870. The L2 cache unit 876 is coupled to one or more other levels of cache and eventually to a main memory.

By way of example, the exemplary register renaming, out-of-order issue/execution core architecture may implement the pipeline 800 as follows: 1) the instruction fetch 838 performs the fetch and length decoding stages 802 and 804; 2) the decode unit 840 performs the decode stage 806; 3) the rename/allocator unit 852 performs the allocation stage 808 and renaming stage 810; 4) the scheduler unit(s) 856 performs the schedule stage 812; 5) the physical register file(s) unit(s) 858 and the memory unit 870 perform the register read/memory read stage 814; the execution cluster 860 perform the execute stage 816; 6) the memory unit 870 and the physical register file(s) unit(s) 858 perform the write back/memory write stage 818; 7) various units may be involved in the exception handling stage 822; and 8) the retirement unit 854 and the physical register file(s) unit(s) 858 perform the commit stage 824.

The core 890 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.), including the instruction(s) described herein. In one embodiment, the core 890 includes logic to support a packed data instruction set extension (e.g., AVX1, AVX2), thereby allowing the operations used by many multimedia applications to be performed using packed data.

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes separate instruction and data cache units 834/874 and a shared L2 cache unit 876, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Specific Exemplary in-Order Core Architecture

Figure 9B:
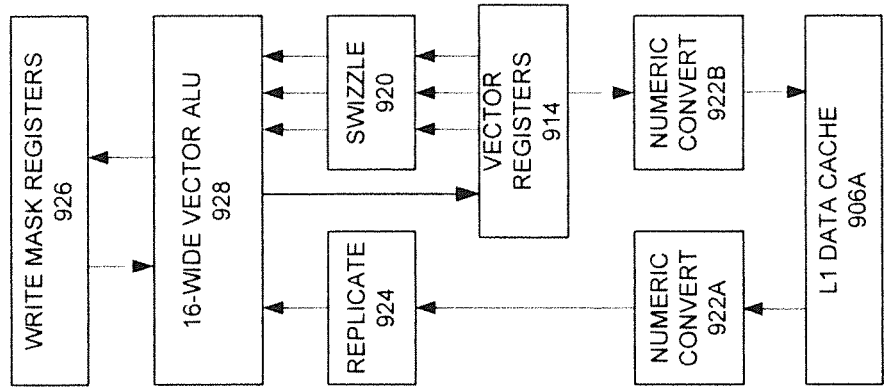
FIG. 9B is an expanded view of part of the processor core in FIG. 9A according to embodiments of the invention.
Figure 9A:
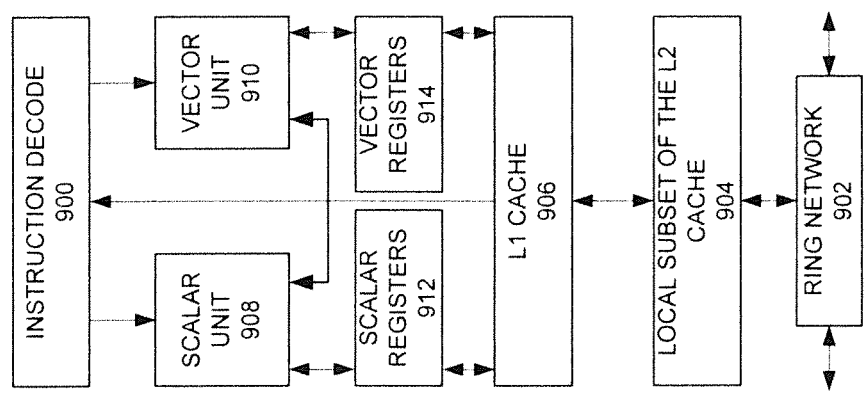
FIG. 9A is a block diagram of a single processor core, along with its connection to the on-die interconnect network and with its local subset of the Level 2 (L2) cache, according to embodiments of the invention.

FIGS. 9A-B illustrate a block diagram of a more specific exemplary in-order core architecture, which core would be one of several logic blocks (including other cores of the same type and/or different types) in a chip. The logic blocks communicate through a high-bandwidth interconnect network (e.g., a ring network) with some fixed function logic, memory I/O interfaces, and other necessary I/O logic, depending on the application.

FIG. 9A is a block diagram of a single processor core, along with its connection to the on-die interconnect network 902 and with its local subset of the Level 2 (L2) cache 904, according to embodiments of the invention. In one embodiment, an instruction decoder 900 supports the x86 instruction set with a packed data instruction set extension. An L1 cache 906 allows low-latency accesses to cache memory into the scalar and vector units. While in one embodiment (to simplify the design), a scalar unit 908 and a vector unit 910 use separate register sets (respectively, scalar registers 912 and vector registers 914) and data transferred between them is written to memory and then read back in from a level 1 (L1) cache 906, alternative embodiments of the invention may use a different approach (e.g., use a single register set or include a communication path that allow data to be transferred between the two register files without being written and read back).

The local subset of the L2 cache 904 is part of a global L2 cache that is divided into separate local subsets, one per processor core. Each processor core has a direct access path to its own local subset of the L2 cache 904. Data read by a processor core is stored in its L2 cache subset 904 and can be accessed quickly, in parallel with other processor cores accessing their own local L2 cache subsets. Data written by a processor core is stored in its own L2 cache subset 904 and is flushed from other subsets, if necessary. The ring network ensures coherency for shared data. The ring network is bi-directional to allow agents such as processor cores, L2 caches and other logic blocks to communicate with each other within the chip. Each ring data-path is 1012-bits wide per direction.

FIG. 9B is an expanded view of part of the processor core in FIG. 9A according to embodiments of the invention. FIG. 9B includes an L1 data cache 906A part of the L1 cache 904, as well as more detail regarding the vector unit 910 and the vector registers 914. Specifically, the vector unit 910 is a 16-wide vector processing unit (VPU) (see the 16-wide ALU 928), which executes one or more of integer, single-precision float, and double-precision float instructions. The VPU supports swizzling the register inputs with swizzle unit 920, numeric conversion with numeric convert units 922A-B, and replication with replication unit 924 on the memory input. Write mask registers 926 allow predicating resulting vector writes.

Processor with Integrated Memory Controller and Graphics

Figure 10:
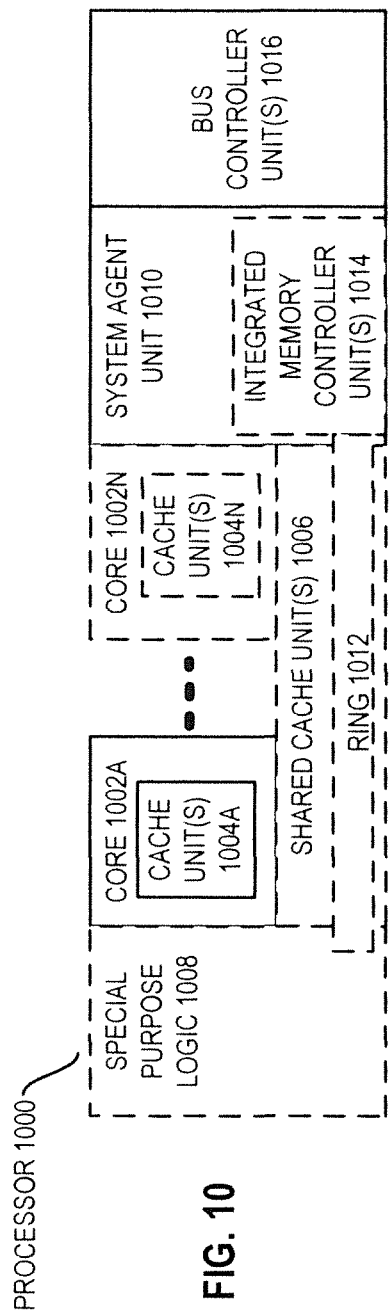
FIG. 10 is a block diagram of a processor that may have more than one core, may have an integrated memory controller, and may have integrated graphics according to embodiments of the invention.

FIG. 10 is a block diagram of a processor 1000 that may have more than one core, may have an integrated memory controller, and may have integrated graphics according to embodiments of the invention. The solid lined boxes in FIG. 10 illustrate a processor 1000 with a single core 1002A, a system agent 1010, a set of one or more bus controller units 1016, while the optional addition of the dashed lined boxes illustrates an alternative processor 1000 with multiple cores 1002A-N, a set of one or more integrated memory controller unit(s) 1014 in the system agent unit 1010, and special purpose logic 1008.

Thus, different implementations of the processor 1000 may include: 1) a CPU with the special purpose logic 1008 being integrated graphics and/or scientific (throughput) logic (which may include one or more cores), and the cores 1002A-N being one or more general purpose cores (e.g., general purpose in-order cores, general purpose out-of-order cores, a combination of the two); 2) a coprocessor with the cores 1002A-N being a large number of special purpose cores intended primarily for graphics and/or scientific (throughput); and 3) a coprocessor with the cores 1002A-N being a large number of general purpose in-order cores. Thus, the processor 1000 may be a general-purpose processor, coprocessor or special-purpose processor, such as, for example, a network or communication processor, compression engine, graphics processor, GPGPU (general purpose graphics processing unit), a high-throughput many integrated core (MIC) coprocessor (including 30 or more cores), embedded processor, or the like. The processor may be implemented on one or more chips. The processor 1000 may be a part of and/or may be implemented on one or more substrates using any of a number of process technologies, such as, for example, BiCMOS, CMOS, or NMOS.

The memory hierarchy includes one or more levels of cache within the cores, a set or one or more shared cache units 1006, and external memory (not shown) coupled to the set of integrated memory controller units 1014. The set of shared cache units 1006 may include one or more mid-level caches, such as level 2 (L2), level 3 (L3), level 4 (L4), or other levels of cache, a last level cache (LLC), and/or combinations thereof. While in one embodiment a ring based interconnect unit 1012 interconnects the integrated graphics logic 1008, the set of shared cache units 1006, and the system agent unit 1010/integrated memory controller unit(s) 1014, alternative embodiments may use any number of well-known techniques for interconnecting such units. In one embodiment, coherency is maintained between one or more cache units 1006 and cores 1002-A-N.

In some embodiments, one or more of the cores 1002A-N are capable of multithreading. The system agent 1010 includes those components coordinating and operating cores 1002A-N. The system agent unit 1010 may include for example a power control unit (PCU) and a display unit. The PCU may be or include logic and components needed for regulating the power state of the cores 1002A-N and the integrated graphics logic 1008. The display unit is for driving one or more externally connected displays.

The cores 1002A-N may be homogenous or heterogeneous in terms of architecture instruction set; that is, two or more of the cores 1002A-N may be capable of execution the same instruction set, while others may be capable of executing only a subset of that instruction set or a different instruction set.

Exemplary Computer Architectures

FIGS. 11-14 are block diagrams of exemplary computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Figure 11:
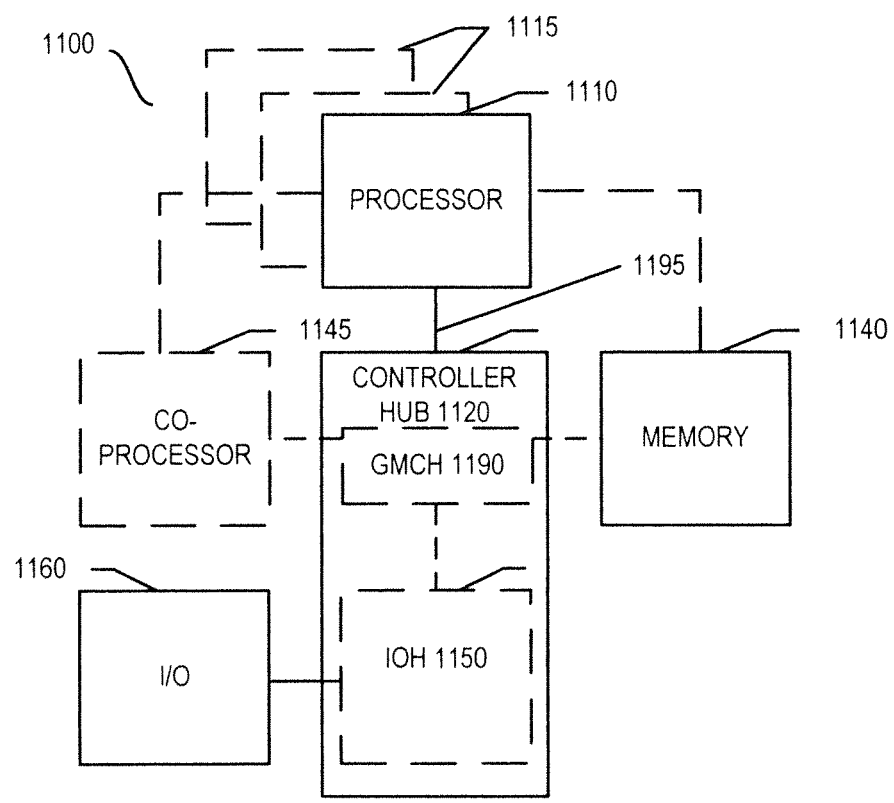
FIG. 11 shown is a block diagram of a system in accordance with one embodiment of the present invention.

Referring now to FIG. 11, shown is a block diagram of a system 1100 in accordance with one embodiment of the present invention. The system 1100 may include one or more processors 1110, 1115, which are coupled to a controller hub 1120. In one embodiment the controller hub 1120 includes a graphics memory controller hub (GMCH) 1190 and an Input/Output Hub (IOH) 1150 (which may be on separate chips); the GMCH 1190 includes memory and graphics controllers to which are coupled memory 1140 and a coprocessor 1145; the IOH 1150 is couples input/output (I/O) devices 1160 to the GMCH 1190. Alternatively, one or both of the memory and graphics controllers are integrated within the processor (as described herein), the memory 1140 and the coprocessor 1145 are coupled directly to the processor 1110, and the controller hub 1120 in a single chip with the IOH 1150.

The optional nature of additional processors 1115 is denoted in FIG. 11 with broken lines. Each processor 1110, 1115 may include one or more of the processing cores described herein and may be some version of the processor 1000.

The memory 1140 may be, for example, dynamic random access memory (DRAM), phase change memory (PCM), or a combination of the two. For at least one embodiment, the controller hub 1120 communicates with the processor(s) 1110, 1115 via a multi-drop bus, such as a frontside bus (FSB), point-to-point interface such as QuickPath Interconnect (QPI), or similar connection 1195.

In one embodiment, the coprocessor 1145 is a special-purpose processor, such as, for example, a high-throughput MIC processor, a network or communication processor, compression engine, graphics processor, GPGPU, embedded processor, or the like. In one embodiment, controller hub 1120 may include an integrated graphics accelerator.

There can be a variety of differences between the physical resources 1110, 1115 in terms of a spectrum of metrics of merit including architectural, microarchitectural, thermal, power consumption characteristics, and the like.

In one embodiment, the processor 1110 executes instructions that control data processing operations of a general type. Embedded within the instructions may be coprocessor instructions. The processor 1110 recognizes these coprocessor instructions as being of a type that should be executed by the attached coprocessor 1145. Accordingly, the processor 1110 issues these coprocessor instructions (or control signals representing coprocessor instructions) on a coprocessor bus or other interconnect, to coprocessor 1145. Coprocessor(s) 1145 accept and execute the received coprocessor instructions.

Figure 12:
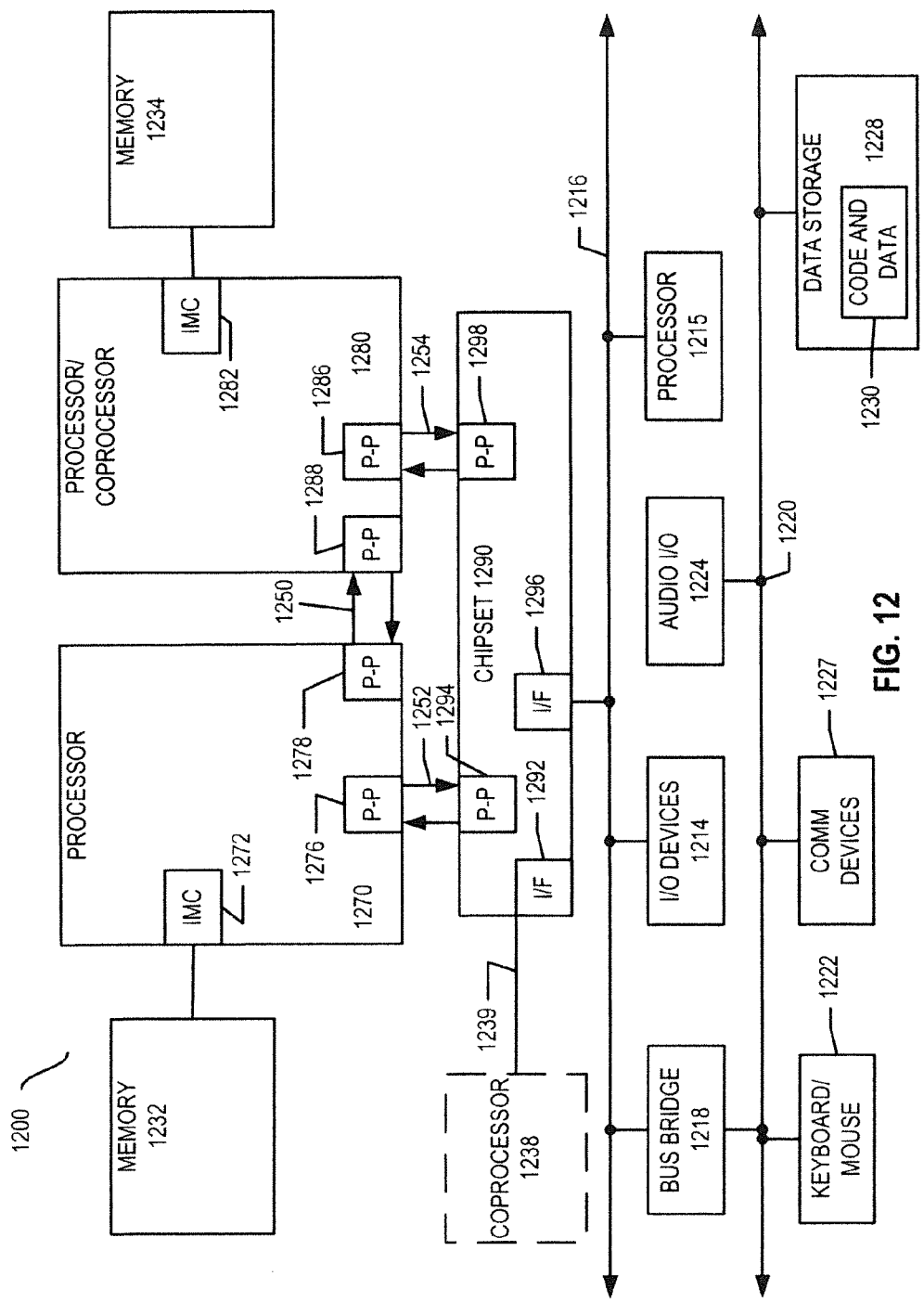
FIG. 12 shown is a block diagram of a first more specific exemplary system in accordance with an embodiment of the present invention.

Referring now to FIG. 12, shown is a block diagram of a first more specific exemplary system 1200 in accordance with an embodiment of the present invention. As shown in FIG. 12, multiprocessor system 1200 is a point-to-point interconnect system, and includes a first processor 1270 and a second processor 1280 coupled via a point-to-point interconnect 1250. Each of processors 1270 and 1280 may be some version of the processor 1000. In one embodiment of the invention, processors 1270 and 1280 are respectively processors 1110 and 1115, while coprocessor 1238 is coprocessor 1145. In another embodiment, processors 1270 and 1280 are respectively processor 1110 coprocessor 1145.

Processors 1270 and 1280 are shown including integrated memory controller (IMC) units 1272 and 1282, respectively. Processor 1270 also includes as part of its bus controller units point-to-point (P-P) interfaces 1276 and 1278; similarly, second processor 1280 includes P-P interfaces 1286 and 1288. Processors 1270, 1280 may exchange information via a point-to-point (P-P) interface 1250 using P-P interface circuits 1278, 1288. As shown in FIG. 12, IMCs 1272 and 1282 couple the processors to respective memories, namely a memory 1232 and a memory 1234, which may be portions of main memory locally attached to the respective processors.

Processors 1270, 1280 may each exchange information with a chipset 1290 via individual P-P interfaces 1252, 1254 using point to point interface circuits 1276, 1294, 1286, 1298. Chipset 1290 may optionally exchange information with the coprocessor 1238 via a high-performance interface 1239. In one embodiment, the coprocessor 1238 is a special-purpose processor, such as, for example, a high-throughput MIC processor, a network or communication processor, compression engine, graphics processor, GPGPU, embedded processor, or the like.

A shared cache (not shown) may be included in either processor or outside of both processors, yet connected with the processors via P-P interconnect, such that either or both processors' local cache information may be stored in the shared cache if a processor is placed into a low power mode.

Chipset 1290 may be coupled to a first bus 1216 via an interface 1296. In one embodiment, first bus 1216 may be a Peripheral Component Interconnect (PCI) bus, or a bus such as a PCI Express bus or another third generation I/O interconnect bus, although the scope of the present invention is not so limited.

As shown in FIG. 12, various I/O devices 1214 may be coupled to first bus 1216, along with a bus bridge 1218 which couples first bus 1216 to a second bus 1220. In one embodiment, one or more additional processor(s) 1215, such as coprocessors, high-throughput MIC processors, GPGPU's, accelerators (such as, e.g., graphics accelerators or digital signal processing (DSP) units), field programmable gate arrays, or any other processor, are coupled to first bus 1216. In one embodiment, second bus 1220 may be a low pin count (LPC) bus. Various devices may be coupled to a second bus 1220 including, for example, a keyboard and/or mouse 1222, communication devices 1227 and a storage unit 1228 such as a disk drive or other mass storage device which may include instructions/code and data 1230, in one embodiment. Further, an audio I/O 1224 may be coupled to the second bus 1220. Note that other architectures are possible. For example, instead of the point-to-point architecture of FIG. 12, a system may implement a multi-drop bus or other such architecture.

Figure 13:
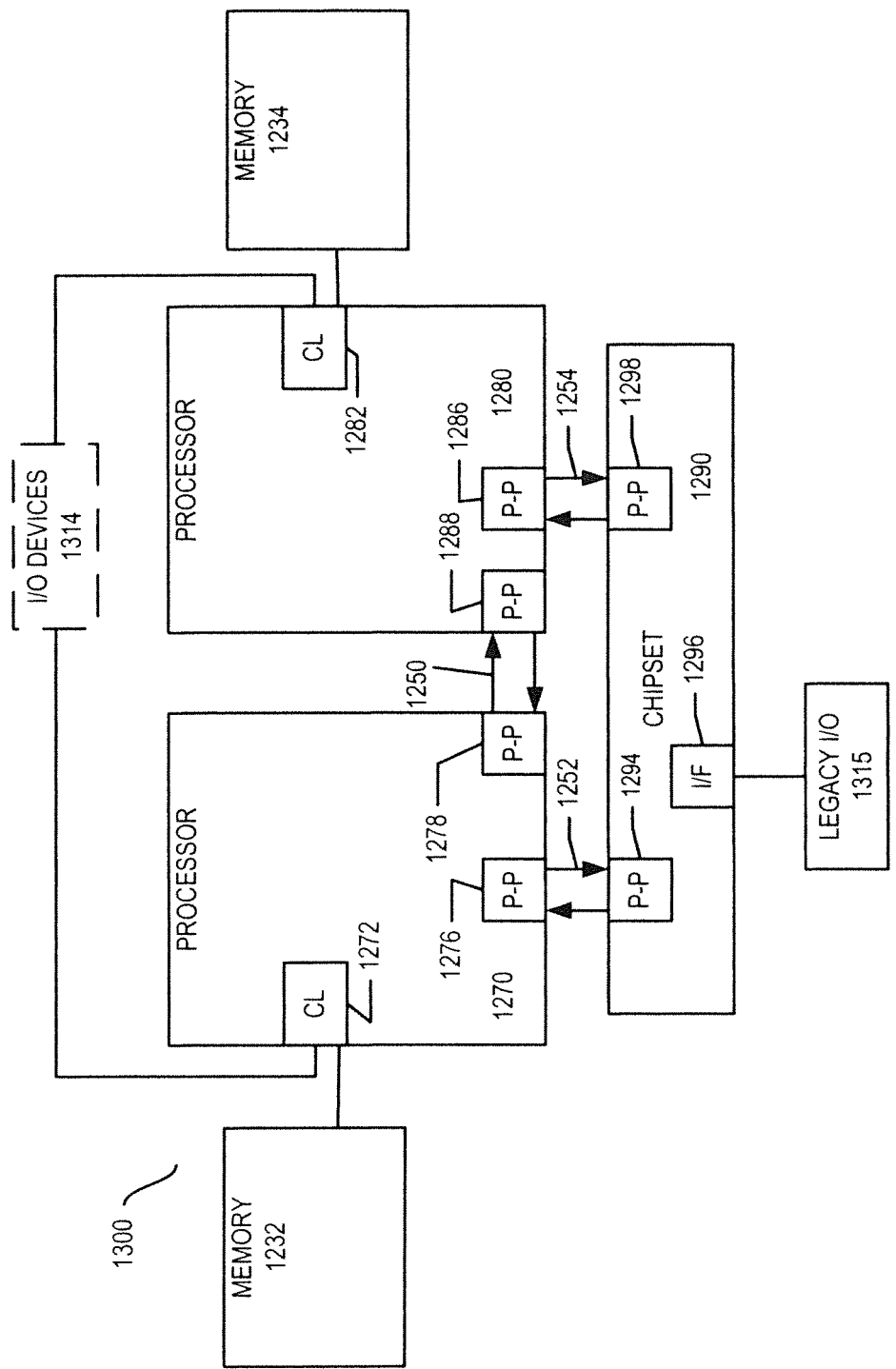
FIG. 13 shown is a block diagram of a second more specific exemplary system in accordance with an embodiment of the present invention.

Referring now to FIG. 13, shown is a block diagram of a second more specific exemplary system 1300 in accordance with an embodiment of the present invention. Like elements in FIGS. 12 and 13 bear like reference numerals, and certain aspects of FIG. 12 have been omitted from FIG. 13 in order to avoid obscuring other aspects of FIG. 13.

FIG. 13 illustrates that the processors 1270, 1280 may include integrated memory and I/O control logic ("CL") 1272 and 1282, respectively. Thus, the CL 1272, 1282 include integrated memory controller units and include I/O control logic. FIG. 13 illustrates that not only are the memories 1232, 1234 coupled to the CL 1272, 1282, but also that I/O devices 1314 are also coupled to the control logic 1272, 1282. Legacy I/O devices 1315 are coupled to the chipset 1290.

Figure 14:
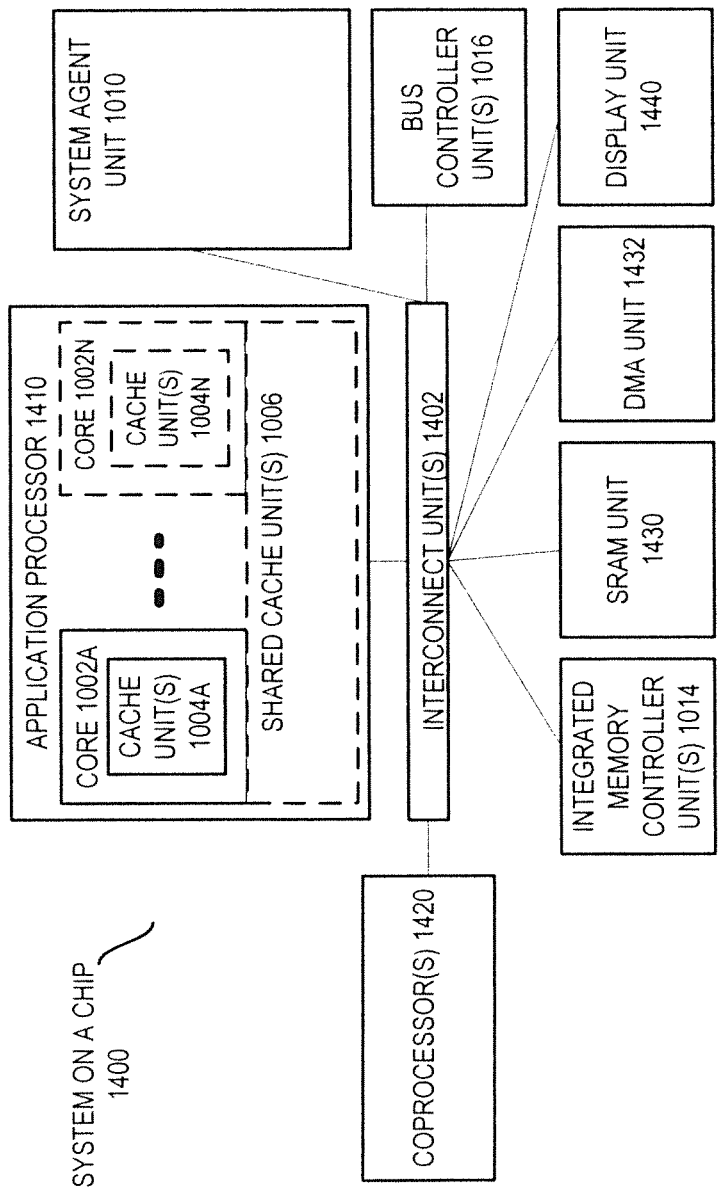
FIG. 14 shown is a block diagram of a SoC in accordance with an embodiment of the present invention.

Referring now to FIG. 14, shown is a block diagram of a SoC 1400 in accordance with an embodiment of the present invention. Similar elements in FIG. 10 bear like reference numerals. Also, dashed lined boxes are optional features on more advanced SoCs. In FIG. 14, an interconnect unit(s) 1402 is coupled to: an application processor 1410 which includes a set of one or more cores 202A-N and shared cache unit(s) 1006; a system agent unit 1010; a bus controller unit(s) 1016; an integrated memory controller unit(s) 1014; a set or one or more coprocessors 1420 which may include integrated graphics logic, an image processor, an audio processor, and a video processor; an static random access memory (SRAM) unit 1430; a direct memory access (DMA) unit 1432; and a display unit 1440 for coupling to one or more external displays. In one embodiment, the coprocessor(s) 1420 include a special-purpose processor, such as, for example, a network or communication processor, compression engine, GPGPU, a high-throughput MIC processor, embedded processor, or the like.

Embodiments of the mechanisms disclosed herein may be implemented in hardware, software, firmware, or a combination of such implementation approaches. Embodiments of the invention may be implemented as computer programs or program code executing on programmable systems comprising at least one processor, a storage system (including volatile and non-volatile memory and/or storage elements), at least one input device, and at least one output device.

Program code, such as code 1230 illustrated in FIG. 12, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritable's (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the invention also include non-transitory, tangible machine-readable media containing instructions or containing design data, such as Hardware Description Language (HDL), which defines structures, circuits, apparatuses, processors and/or system features described herein. Such embodiments may also be referred to as program products.

Emulation (Including Binary Translation, Code Morphing, Etc.)

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

FIG. 15 is a block diagram contrasting the use of a software instruction converter to convert binary instructions in a source instruction set to binary instructions in a target instruction set according to embodiments of the invention. In the illustrated embodiment, the instruction converter is a software instruction converter, although alternatively the instruction converter may be implemented in software, firmware, hardware, or various combinations thereof. FIG. 15 shows a program in a high level language 1502 may be compiled using an x86 compiler 1504 to generate x86 binary code 1506 that may be natively executed by a processor with at least one x86 instruction set core 1516. The processor with at least one x86 instruction set core 1516 represents any processor that can perform substantially the same functions as an Intel processor with at least one x86 instruction set core by compatibly executing or otherwise processing (1) a substantial portion of the instruction set of the Intel x86 instruction set core or (2) object code versions of applications or other software targeted to run on an Intel processor with at least one x86 instruction set core, in order to achieve substantially the same result as an Intel processor with at least one x86 instruction set core. The x86 compiler 1504 represents a compiler that is operable to generate x86 binary code 1506 (e.g., object code) that can, with or without additional linkage processing, be executed on the processor with at least one x86 instruction set core 1516. Similarly, FIG. 15 shows the program in the high level language 1502 may be compiled using an alternative instruction set compiler 1508 to generate alternative instruction set binary code 1510 that may be natively executed by a processor without at least one x86 instruction set core 1514 (e.g., a processor with cores that execute the MIPS instruction set of MIPS Technologies of Sunnyvale, Calif. and/or that execute the ARM instruction set of ARM Holdings of Sunnyvale, Calif.). The instruction converter 1512 is used to convert the x86 binary code 1506 into code that may be natively executed by the processor without an x86 instruction set core 1514. This converted code is not likely to be the same as the alternative instruction set binary code 1510 because an instruction converter capable of this is difficult to make; however, the converted code will accomplish the general operation and be made up of instructions from the alternative instruction set. Thus, the instruction converter 1512 represents software, firmware, hardware, or a combination thereof that, through emulation, simulation or any other process, allows a processor or other electronic device that does not have an x86 instruction set processor or core to execute the x86 binary code 1506.

In the description and claims, the terms "coupled" and "connected," along with their derivatives, may have been used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other. For example, an execution unit may be coupled with a register through one or more intervening components. In the figures, arrows are used to show connections and couplings.

In the description and claims, the term "logic" may have been used. As used herein, logic may include hardware, firmware, software, or a combination thereof. Examples of logic include integrated circuitry, application specific integrated circuits, analog circuits, digital circuits, programmed logic devices, memory devices including instructions, etc. In some embodiments, the hardware logic may include transistors and/or gates potentially along with other circuitry components.

The term "and/or" may have been used. As used herein, the term "and/or" means one or the other or both (e.g., A and/or B means A or B or both A and B).

In the description above, for purposes of explanation, numerous specific details have been set forth in order to provide a thorough understanding of embodiments of the invention. It will be apparent however, to one skilled in the art, that one or more other embodiments may be practiced without some of these specific details. The particular embodiments described are not provided to limit the invention but to illustrate it through example embodiments. The scope of the invention is not to be determined by the specific examples but only by the claims. In other instances, well-known circuits, structures, devices, and operations have been shown in block diagram form or without detail in order to avoid obscuring the understanding of the description.

Where considered appropriate, reference numerals, or terminal portions of reference numerals, have been repeated among the figures to indicate corresponding or analogous elements, which may optionally have similar or the same characteristics, unless specified or clearly apparent otherwise. In some cases, where multiple components have been described, they may be incorporated into a single component. In other cases, where a single component has been described, it may be partitioned into multiple components.

Various operations and methods have been described. Some of the methods have been described in a relatively basic form in the flow diagrams, but operations may optionally be added to and/or removed from the methods. In addition, while the flow diagrams show a particular order of the operations according to example embodiments, that particular order is exemplary. Alternate embodiments may optionally perform the operations in different order, combine certain operations, overlap certain operations, etc.

Some embodiments include an article of manufacture (e.g., a computer program product) that includes a machine-readable medium. The medium may include a mechanism that provides, for example stores, information in a form that is readable by the machine. The machine-readable medium may provide, or have stored thereon, one or more, or a sequence of instructions, that if and/or when executed by a machine causes the machine to perform and/or results in the machine performing one or operations, methods, or techniques disclosed herein. In some embodiments, the machine-readable medium may include a tangible and/or non-transitory machine-readable storage media. For example, the tangible non-transitory machine-readable storage media may include a floppy diskette, an optical storage medium, an optical disk, a CD-ROM, a magnetic disk, a magneto-optical disk, a read only memory (ROM), a programmable ROM (PROM), an erasable-and-programmable ROM (EPROM), an electrically-erasable-and-programmable ROM (EEPROM), a random access memory (RAM), a static-RAM (SRAM), a dynamic-RAM (DRAM), a Flash memory, a phase-change memory, or the like. The tangible medium may include one or more solid or tangible physical data storage materials, such as, for example, a semiconductor material, a phase change material, a magnetic material, etc. The data storage medium does not consist of a transitory propagated signal. In some embodiments, the storage medium is non-volatile. Examples of suitable machines include, but are not limited to, servers, desktops, laptops, notebooks, netbooks, tablets, smartphones, cellular phones, Mobile Internet devices (MIDs), media players, smart televisions, nettops, network elements (e.g., routers, switches, etc.) nettops, set-top boxes, video game controllers, and other computer systems or electronic devices having one or more processors.

It should also be appreciated that reference throughout this specification to "one embodiment", "an embodiment", or "one or more embodiments", for example, means that a particular feature may be included in the practice of the invention. Similarly, it should be appreciated that in the description various features are sometimes grouped together in a single embodiment, Figure, or description thereof for the purpose of streamlining the disclosure and aiding in the understanding of various inventive aspects. This method of disclosure, however, is not to be interpreted as reflecting an intention that the invention requires more features than are expressly recited in each claim. Rather, as the following claims reflect, inventive aspects may lie in less than all features of a single disclosed embodiment. Thus, the claims following the Detailed Description are hereby expressly incorporated into this Detailed Description, with each claim standing on its own as a separate embodiment of the invention.

EXAMPLE EMBODIMENTS

The following examples pertain to further embodiments. Specifics in the examples may be used anywhere in one or more embodiments.

Example 1 is a processor that includes a set of registers capable of storing packed data. The processor also includes an execution unit coupled with the set of registers. The execution unit is to access the set of registers in at least two different ways in response to instructions. The at least two different ways including a first way in which the set of registers are to represent a plurality of N-bit registers, and a second way in which the set of registers are to represent a single register of at least 2N-bits, and in which the at least 2N-bits is to be at least 256-bits.

Example 2 includes the processor of Example 1 and optionally in which in the second way the set of registers are to represent the single register of 4N-bits, and in which the execution unit is also to access the set of registers in a third way in which the set of registers are to represent a plurality of 2N-bit registers.

Example 3 includes the processor of Example 2 and optionally in which in the second way the set of registers are to represent the single register which is to have at least 512-bits.

Example 4 includes the processor of Example 1 and optionally in which the execution unit is also to access the set of registers in a third way in which the set of registers are to represent a plurality of N/2-bit registers.

Example 5 includes the processor of Example 1 and optionally in which in the first way the set of registers are to represent a plurality of 256-bit registers and in the second way the set of registers are to represent a single register of 512-bits.

Example 6 includes the processor of Example 1 and optionally in which in the second way the set of registers are to represent a single register of at least 512-bits.

Example 7 includes the processor of Example 1 and optionally in which in the first way the set of registers are to represent a plurality of 128-bit registers and in the second way the set of registers are to represent a single register of 256-bits.

Example 8 includes the processor of any of Examples 1-7 and optionally in which the execution unit is to be responsive to an instruction having an opcode to indicate a way in which the execution unit is to access the set of registers for that instruction.

Example 9 includes the processor of any of Examples 1-7 and optionally in which the execution unit is to be responsive to an instruction having a field other than an opcode to indicate a way in which the execution unit is to access the set of registers for that instruction.

Example 10 includes the processor of any of Examples 1-7 and optionally in which the processor includes a reduced instruction set computing (RISC) processor, and in which the set of registers are N/2-bit registers.

Example 11 includes the processor of any of Examples 1-7 and optionally in which the processor includes a reduced instruction set computing (RISC) processor, and in which the set of registers are N-bit registers.

Example 12 includes the processor of any of Examples 1-7 and optionally in which the execution unit is responsive to an instruction has one or more fields to specify the set of registers that in the second way are to represent the single register.

Example 13 is a method performed by a processor that includes accessing a set of registers in a first way, in which the set of registers represent a plurality of N-bit registers, to retrieve a corresponding N-bit packed data from each of the plurality of the N-bit registers. The method also includes accessing the set of registers in a second way, in which the set of registers represent a single register of at least 2N-bits, to retrieve a corresponding packed data of at least 2N-bits from the single register, the at least 2N-bits to be at least 256-bits.

Example 14 includes the method of Example 13 and optionally in which accessing in the second way includes accessing the set of registers that represent the single register of 4N-bits, and further including accessing the set of registers in a third way in which the set of registers are to represent a plurality of 2N-bit registers.

Example 15 includes the method of Example 13 and optionally in which accessing in the second way includes accessing the set of registers that represent the single register having at least 512-bits.

Example 16 includes the method of Example 13 and optionally further including accessing the set of registers in a third way in which the set of registers are to represent a plurality of N/2-bit registers.

Example 17 includes the method of Example 13 and optionally in which accessing in the first way includes accessing the set of registers which represent the plurality of 256-bit registers, and in which accessing in the second way includes accessing the set of registers which represent the single register of 512-bits.

Example 18 includes the method of Example 13 and optionally in which accessing in the first way includes accessing the set of registers which represent the plurality of 128-bit registers, and in which accessing in the second way includes accessing the set of registers which represent the single register of 256-bits.

Example 19 includes the method of any of Examples 13-18 and optionally in which accessing in the second way is responsive to an instruction having an opcode to indicate that the set of registers are to be accessed in the second way.

Example 20 includes the method of any of Examples 13-18 and optionally in which accessing in the second way is responsive to an instruction having a field other than an opcode to indicate that the set of registers are to be accessed in the second way.

Example 21 includes the method of any of Examples 13-18 and optionally in which accessing in the second way includes accessing the set of registers that are N/2-bit registers.

Example 22 includes the method of any of Examples 13-18 and optionally in which accessing in the second way includes accessing the set of registers that are N-bit registers.

Example 23 is a system to process instructions that includes an interconnect, and a processor coupled with the interconnect. The processor includes a set of registers, and an execution unit coupled with the set of registers. The execution unit is to access the set of registers in at least three different ways in response to packed data instructions. The at least three different ways are to include a first way in which the set of registers are to represent a plurality of N-bit registers to store packed data. Also, a second way in which the set of registers are to represent a single register of at least 2N-bits to store packed data. Also, a third way in which the set of registers are to represent a plurality of registers having a width other than N-bits and less than the at least 2N-bits. The system also includes a dynamic random access memory (DRAM) coupled with the interconnect.

Example 24 includes the system of Example 23 and optionally in which in the second way the set of registers are to represent the single register of at least 256-bits.

Example 25 is an article of manufacture including a non-transitory machine-readable storage medium that stores instructions that, if executed by a machine, will cause the machine to perform operations including accessing a set of registers in a first way, in which the set of registers represent a plurality of N-bit registers, to retrieve a corresponding N-bit packed data from each of the plurality of the N-bit registers. The operations also include accessing the set of registers in a second way, in which the set of registers represent a single register of at least 2N-bits, to retrieve a corresponding packed data of at least 2N-bits from the single register, the at least 2N-bits to be at least 256-bits. The operations also include accessing the set of registers in a third way, in which the set of registers represent a plurality of registers each having a different number of bits than in the first and second ways.

Example 26 includes the article of manufacture of Example 25 and optionally in which the machine-readable storage medium further stores instructions that if executed by the machine will cause the machine to performing operations including accessing the set of registers in the second way in which the set of registers represent the single register of at least 256-bits.

Example 27 is a processor including means for accessing a set of registers in a first way, in which the set of registers represent a plurality of N-bit registers, to retrieve a corresponding N-bit packed data from each of the plurality of the N-bit registers. The processor also includes means for accessing the set of registers in a second way, in which the set of registers represent a single register of at least 2N-bits, to retrieve a corresponding packed data of at least 2N-bits from the single register, the at least 2N-bits to be at least 256-bits.

Example 28 includes the processor of Example 27 and optionally in which the means for accessing in the second way includes means for accessing the set of registers that represent the single register of 4N-bits, and further including means for accessing the set of registers in a third way in which the set of registers are to represent a plurality of 2N-bit registers.

Example 29 is a machine-readable storage medium storing instructions that if executed by a machine are to cause the machine to perform the method of any of Examples 13-22.

Example 30 is a processor to perform the method of any of Examples 13-22.

Example 31 is a processor including means for performing the method of any of Examples 13-22.

Example 32 is a processor including integrated circuitry and/or logic and/or units and/or components and/or modules, or any combination thereof, to perform the methods of any of Examples 13-22.

Example 33 is a computer system to perform the method of any of Examples 13-22.

Example 34 is a processor to perform one or more operations or a method substantially as described herein.

Example 35 is a processor including means for performing one or more operations or a method substantially as described herein.

What is claimed is:

1. A processor comprising:
a set of registers each capable of storing packed data;
a decode unit to decode instructions of an instruction set of the processor; and
an execution unit coupled with the set of registers, and coupled with the decode unit, the execution unit to access the set of registers in at least two different ways in response to the decoded instructions, the at least two different ways including:
a first way in which the set of registers are to represent a plurality of N-bit architectural registers, wherein at least one of the instructions of the instruction set has a field to explicitly specify any one of the plurality of N-bit architectural registers; and
a second way in which the set of registers are to represent a single architectural register of at least 2N-bits, and in which the at least 2N-bits is to be at least 256-bits.

2. The processor of claim 1, in which in the second way the set of registers are to represent the single architectural register of 4N-bits, and in which the execution unit is also to access the set of registers in a third way in which the set of registers are to represent a plurality of 2N-bit architectural registers.

3. The processor of claim 2, in which in the second way the set of registers are to represent the single architectural register which is to have at least 512-bits.

4. The processor of claim 1, in which the execution unit is also to access the set of registers in a third way in which the set of registers are to represent a plurality of architectural N/2-bit registers.

5. The processor of claim 1, in which in the first way the set of registers are to represent the plurality of 256-bit architectural registers and in the second way the set of registers are to represent the single architectural register of 512-bits.

6. The processor of claim 1, in which in the second way the set of registers are to represent the single architectural register of at least 512-bits.

7. The processor of claim 1, in which in the first way the set of registers are to represent the plurality of 128-bit architectural registers and in the second way the set of registers are to represent the single architectural register of 256-bits.

8. The processor of claim 1, in which the execution unit is to be responsive to an instruction having an opcode to indicate a way in which the execution unit is to access the set of registers for that instruction.

9. The processor of claim 1, in which the execution unit is to be responsive to an instruction having a field other than an opcode to indicate a way in which the execution unit is to access the set of registers for that instruction.

10. The processor of claim 1, in which the processor comprises a reduced instruction set computing (RISC) processor, and in which the set of registers are N/2-bit registers.

11. The processor of claim 1, in which the processor comprises a reduced instruction set computing (RISC) processor, and in which the set of registers are N-bit registers.

12. The processor of claim 1, in which the execution unit is responsive to an instruction has one or more fields to specify the set of registers that in the second way are to represent the single architectural register.

13. A method performed by a processor comprising:
accessing a set of registers in a first way, in which the set of registers represent a plurality of N-bit architectural registers, to retrieve a corresponding N-bit packed data from each of the plurality of the N-bit architectural registers, wherein at least one instruction of an instruction set of the processor has a field to explicitly specify any one of the plurality of N-bit architectural registers; and
accessing the set of registers in a second way, in which the set of registers represent a single architectural register of at least 2N-bits, to retrieve a corresponding packed data of at least 2N-bits from the single architectural register, the at least 2N-bits being at least 256-bits, wherein at least one instruction of the instruction set of the processor has a field to explicitly specify the single architectural register of at least 2N-bits.

14. The method of claim 13, in which accessing in the second way comprises accessing the set of registers that represent the single architectural register of 4N-bits, and further comprising accessing the set of registers in a third way in which the set of registers represent a plurality of 2N-bit architectural registers.

15. The method of claim 13, in which accessing in the second way comprises accessing the set of registers that represent the single architectural register having at least 512-bits.

16. The method of claim 13, further comprising accessing the set of registers in a third way in which the set of registers represent a plurality of N/2-bit architectural registers.

17. The method of claim 13, in which accessing in the first way comprises accessing the set of registers which represent the plurality of 256-bit architectural registers, and in which accessing in the second way comprises accessing the set of registers which represent the single architectural register of 512-bits.

18. The method of claim 13, in which accessing in the first way comprises accessing the set of registers which represent the plurality of 128-bit architectural registers, and in which accessing in the second way comprises accessing the set of registers which represent the single architectural register of 256-bits.

19. The method of claim 13, in which accessing in the second way is responsive to an instruction having an opcode to indicate that the set of registers are to be accessed in the second way.

20. The method of claim 13, in which accessing in the second way is responsive to an instruction having a field other than an opcode to indicate that the set of registers are to be accessed in the second way.

21. The method of claim 13, in which accessing in the second way comprises accessing the set of registers that are N/2-bit registers.

22. A system to process instructions comprising:
an interconnect;
a processor coupled with the interconnect, the processor comprising:
a set of registers each able to store packed data;
an execution unit coupled with the set of registers, the execution unit to access the set of registers in at least three different ways in response to packed data instructions, the at least three different ways including:
a first way in which the set of registers are to represent a plurality of N-bit architectural registers to store packed data, wherein at least one packed data instruction of an instruction set of the processor has a field to explicitly specify any one of the plurality of N-bit architectural registers;
a second way in which the set of registers are to represent a single architectural register of at least 2N-bits to store packed data, wherein at least one packed data instruction of the instruction set of the processor has a field to explicitly specify the single architectural register of at least 2N-bits; and
a third way in which the set of registers are to represent a plurality of architectural registers having a width other than N-bits and less than the at least 2N-bits; and
a dynamic random access memory (DRAM) coupled with the interconnect.

23. The system of claim 22, in which in the second way the set of registers are to represent the single architectural register of at least 256-bits.

24. An article of manufacture comprising a non-transitory machine-readable storage medium that stores instructions that, if executed by a machine, will cause the machine to perform operations including to:
access a set of registers in a first way, in which the set of registers represent a plurality of N-bit architectural registers, to retrieve a corresponding N-bit packed data from each of the plurality of the N-bit registers, wherein at least one of the instructions, which is included in an instruction set, has a field to explicitly specify any one of the plurality of N-bit architectural registers;
access the set of registers in a second way, in which the set of registers represent a single architectural register of at least 2N-bits, to retrieve a corresponding packed data of at least 2N-bits from the single architectural register, the at least 2N-bits to be at least 256-bits, wherein at least one of the instructions, which is included in the instruction set, has a field to explicitly specify the single architectural register of at least 2N-bits; and access the set of registers in a third way, in which the set of registers represent a plurality of architectural registers each having a different number of bits than in the first and second ways.

25. The article of manufacture of claim 24, wherein the machine-readable storage medium further stores instructions that if executed by the machine will cause the machine to performing operations including to:
  access the set of registers in the second way in which the set of registers represent the single architectural register of at least 256-bits.

26. The processor of claim 1, in which the set of registers that are to represent the single architectural register of said at least 2N bits are to be sequential registers.

27. A processor comprising:
  a decode unit to decode a first instruction of an instruction set of the processor that is to have a field to explicitly specify a first N-bit architectural register and a second instruction of the instruction set that is to have a field to explicitly specify an architectural register of at least 2N-bits; and
  an execution unit coupled with the decode unit, the execution unit in response to the first instruction to access the first N-bit architectural register, and the execution unit in response to the second instruction to access the architectural register of at least 2N-bits,
  in which the at least 2N-bits is to be at least 256-bits, and
  in which the architectural register of the at least 2N-bits is to be mapped to the first N-bit architectural register and a second sequentially numbered N-bit architectural register that is to sequentially follow the first N-bit architectural register.

28. The processor of claim 27, in which the first N-bit architectural register is a 128-bit architectural register, and wherein the architectural register of at least 2N-bits is an architectural register.

29. The processor of claim 27, in which the first N-bit architectural register is a 256-bit architectural register.

30. A processor comprising:
  a decode unit to decode a first instruction of an instruction set of the processor that is to have a field to explicitly specify a first 128-bit architectural register and a second instruction of the instruction set of the processor that is to have a field to explicitly specify a second architectural register of at least 512-bits; and
  an execution unit coupled with the decode unit, the execution unit, in response to the first instruction being decoded, to access the first 128-bit architectural register, and the execution unit in response to the second instruction being decoded to access the second architectural register of at least 512-bits,
  in which the second architectural register of the at least 512-bits is to be mapped to the first 128-bit architectural register and a plurality of sequentially numbered 128-bit architectural registers that are to sequentially follow the first 128-bit architectural register.

* * * * *